Figure 15:
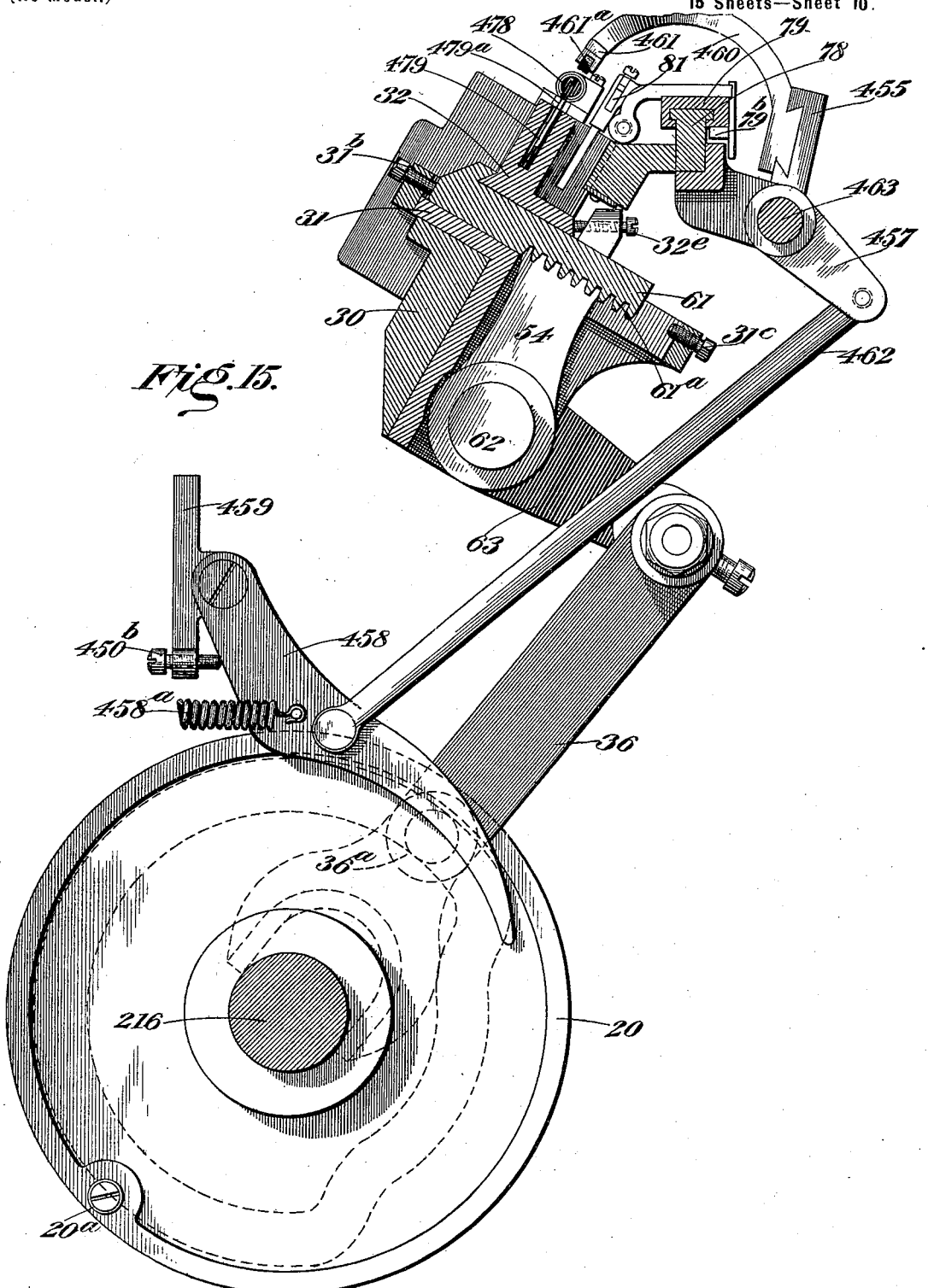

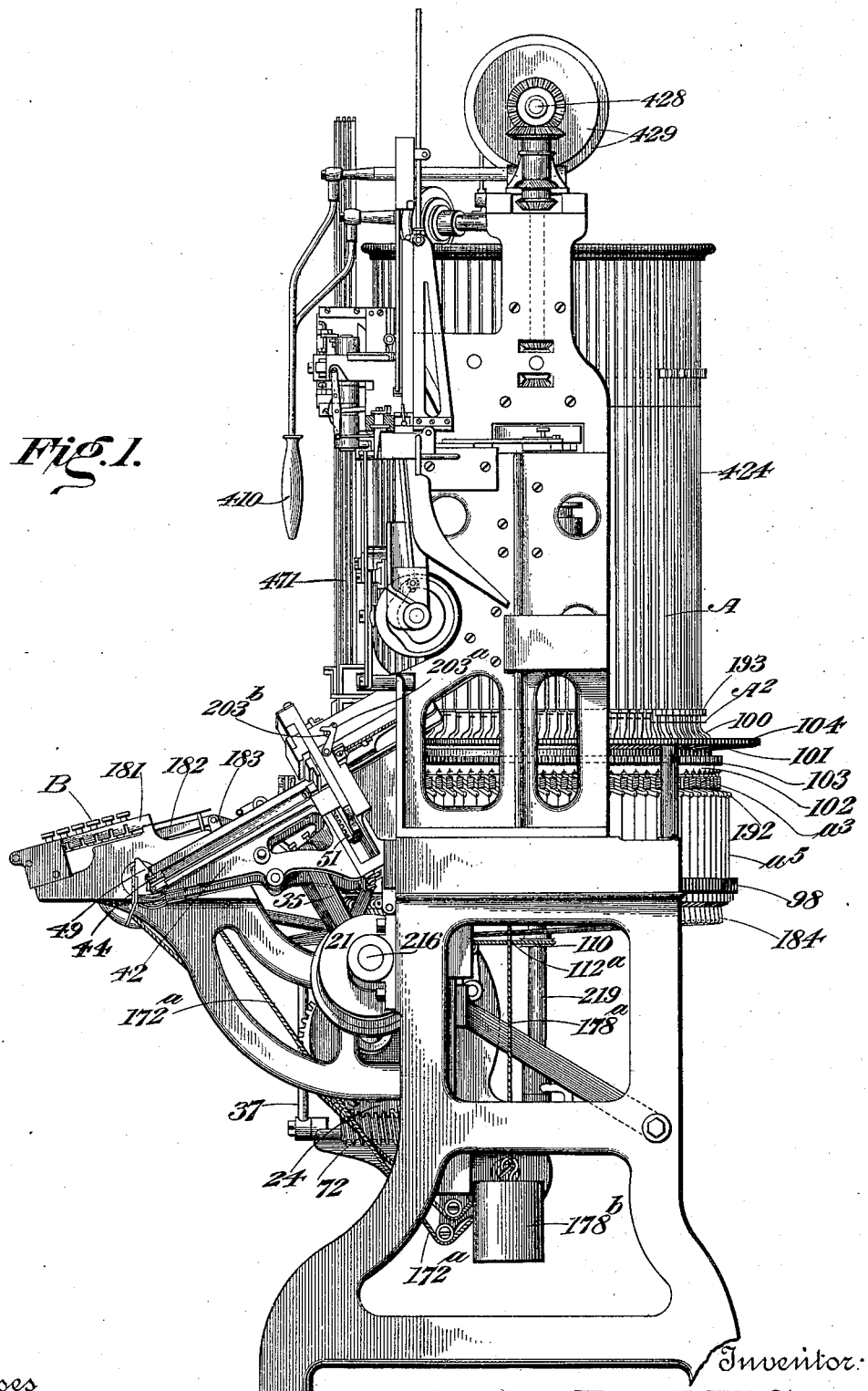

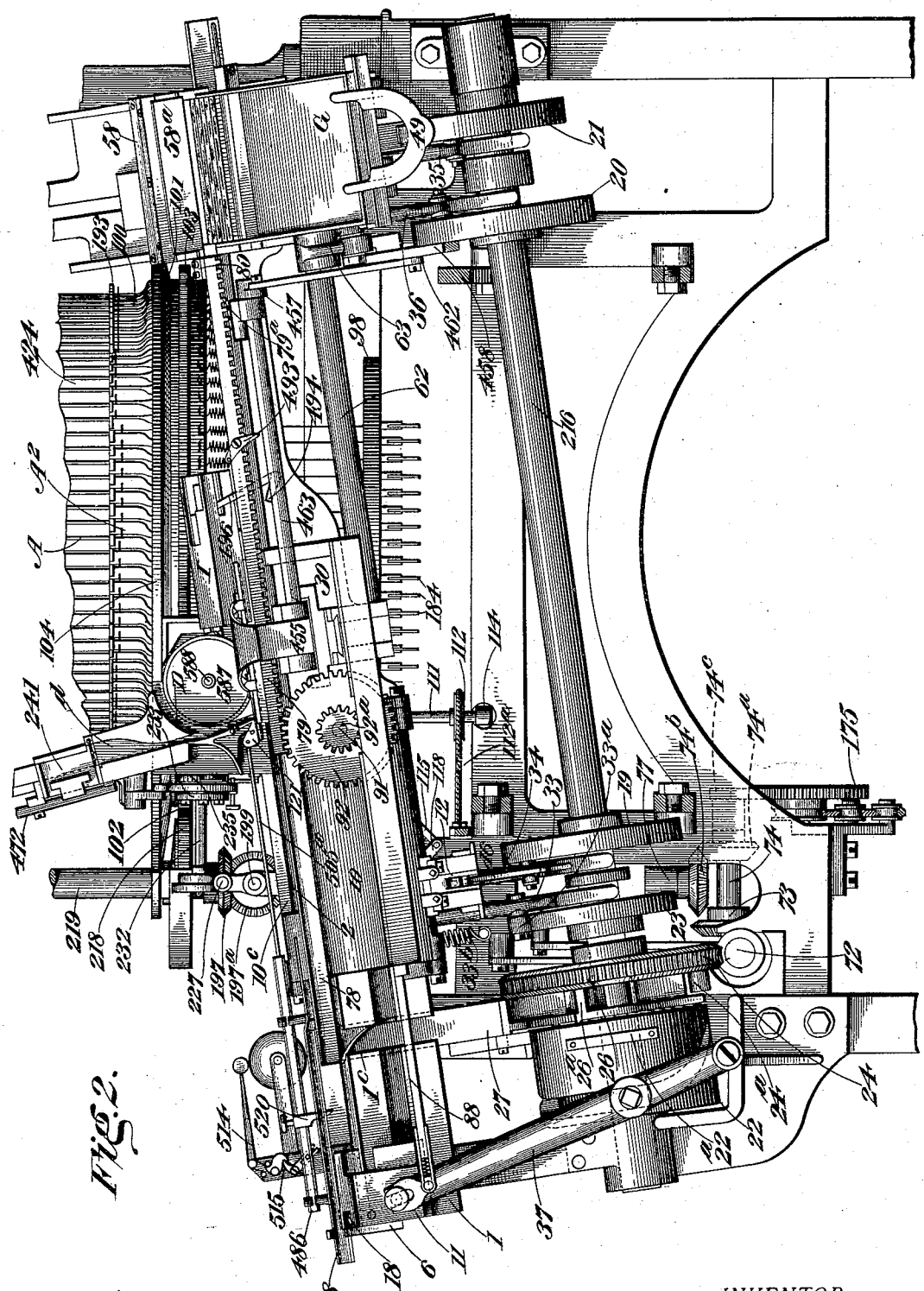

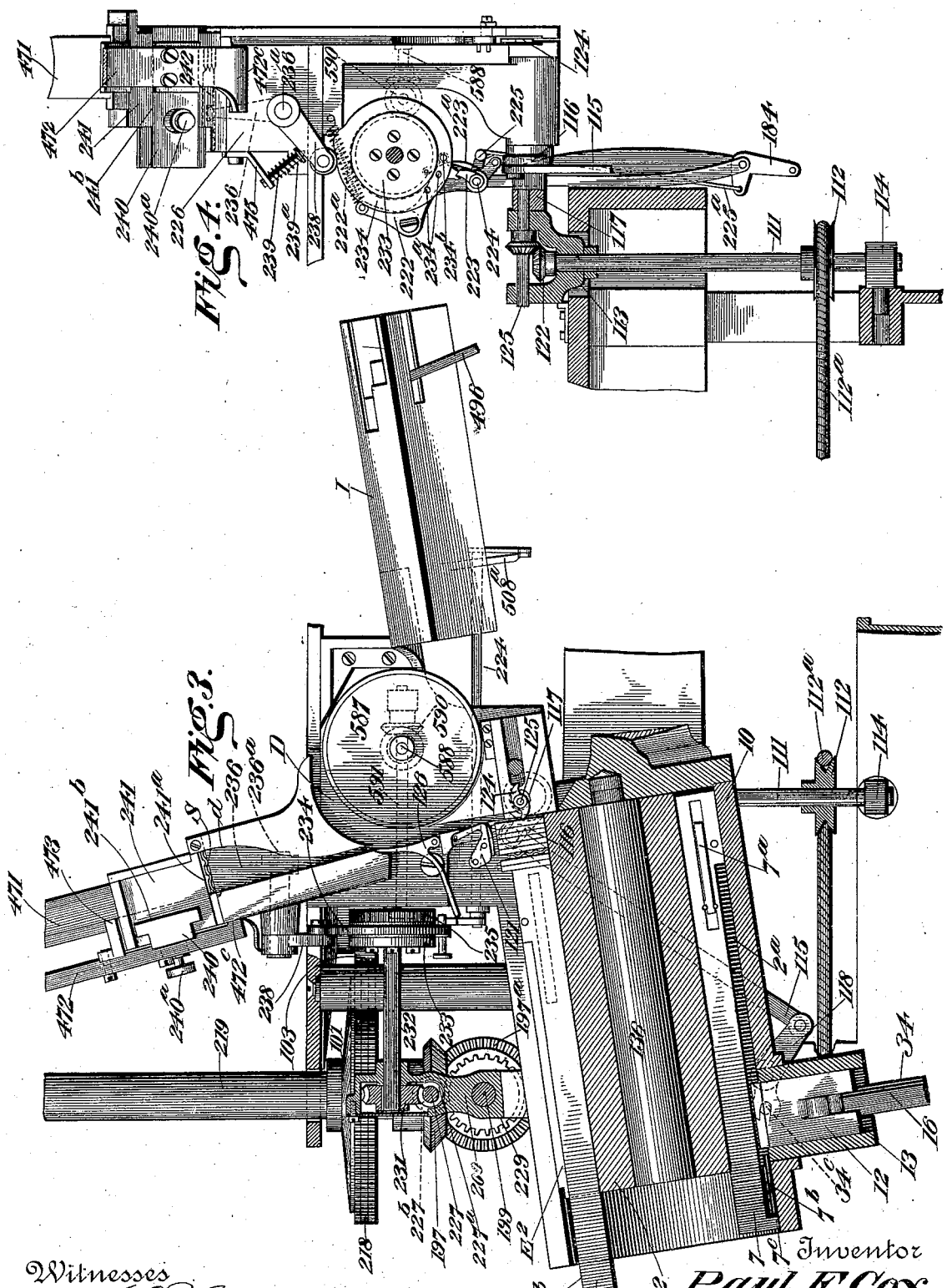

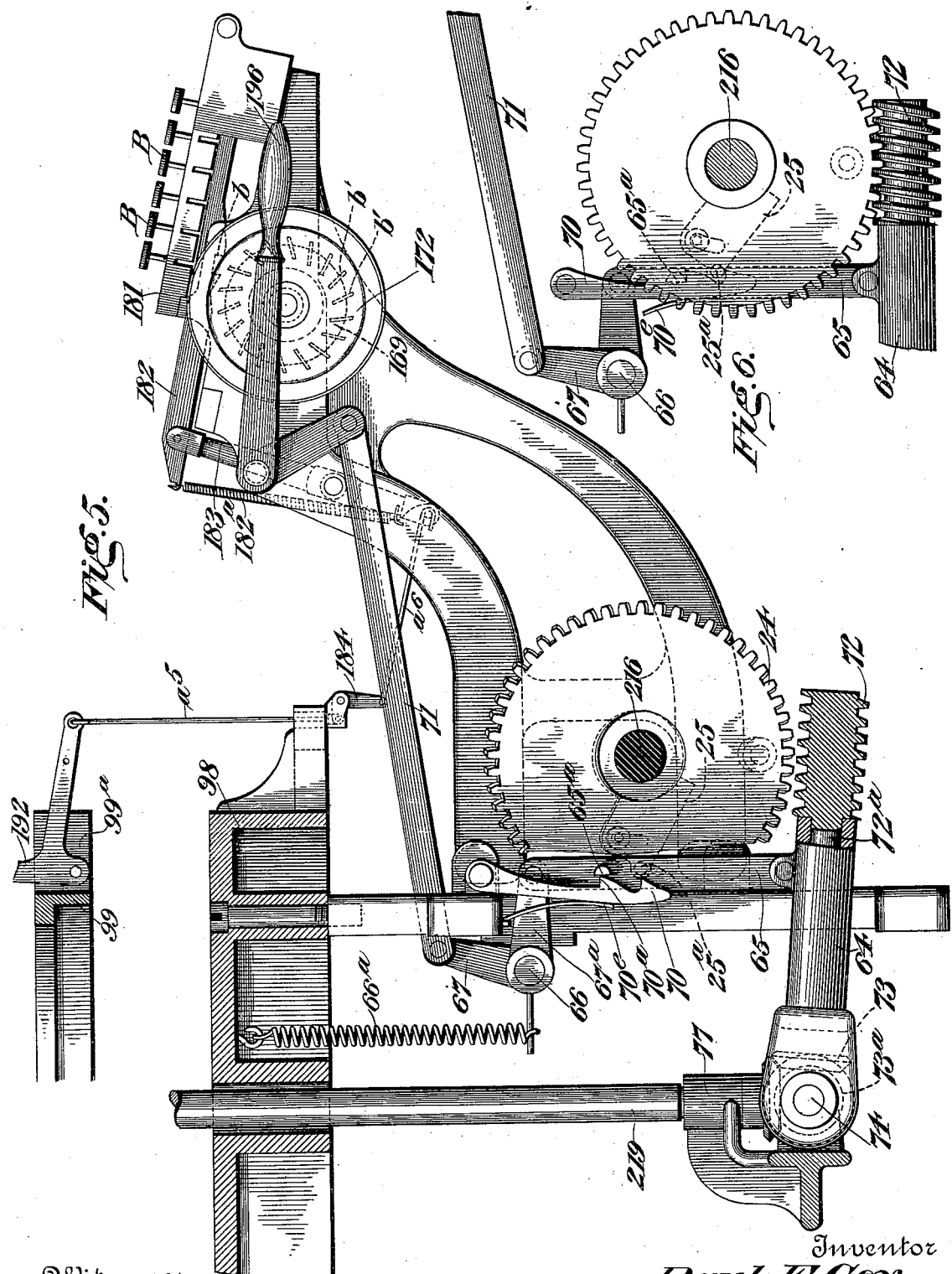

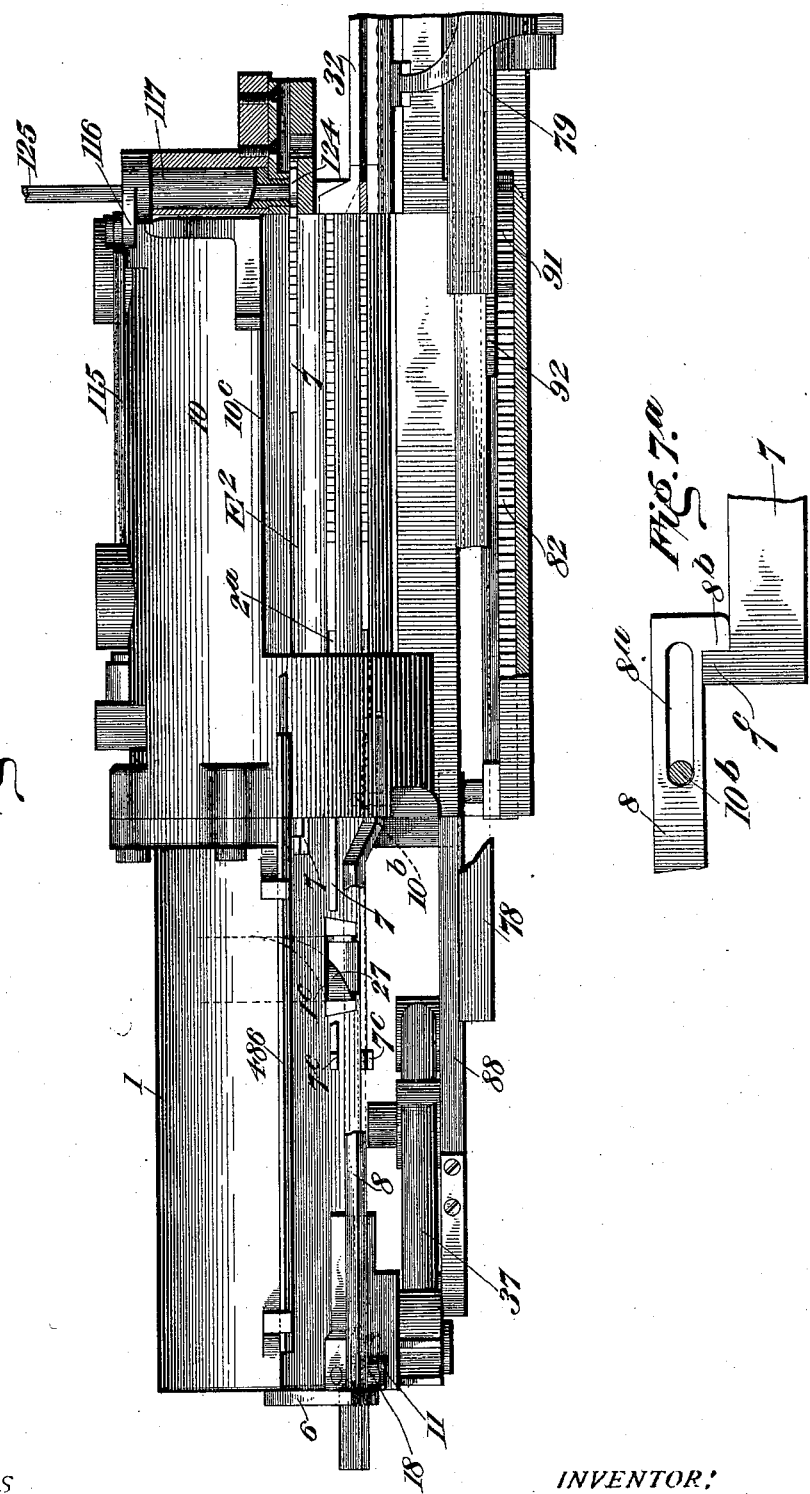

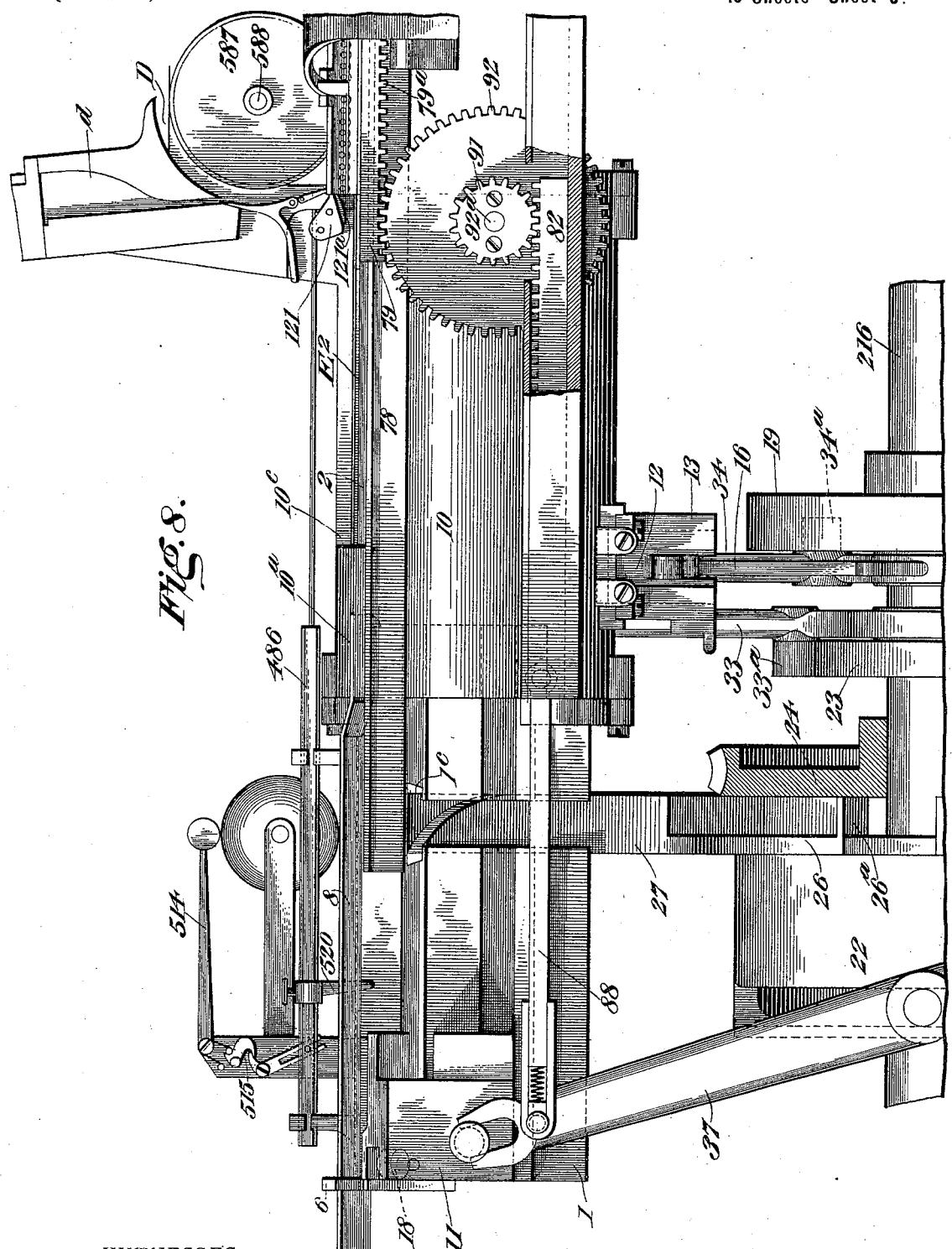

No. 646,358. Patented Mar. 27, 1900.
P. F. COX.
TYPE SETTING MACHINE.
(Application filed Aug. 14, 1899.)
(No Model.) 15 Sheets—Sheet 7.
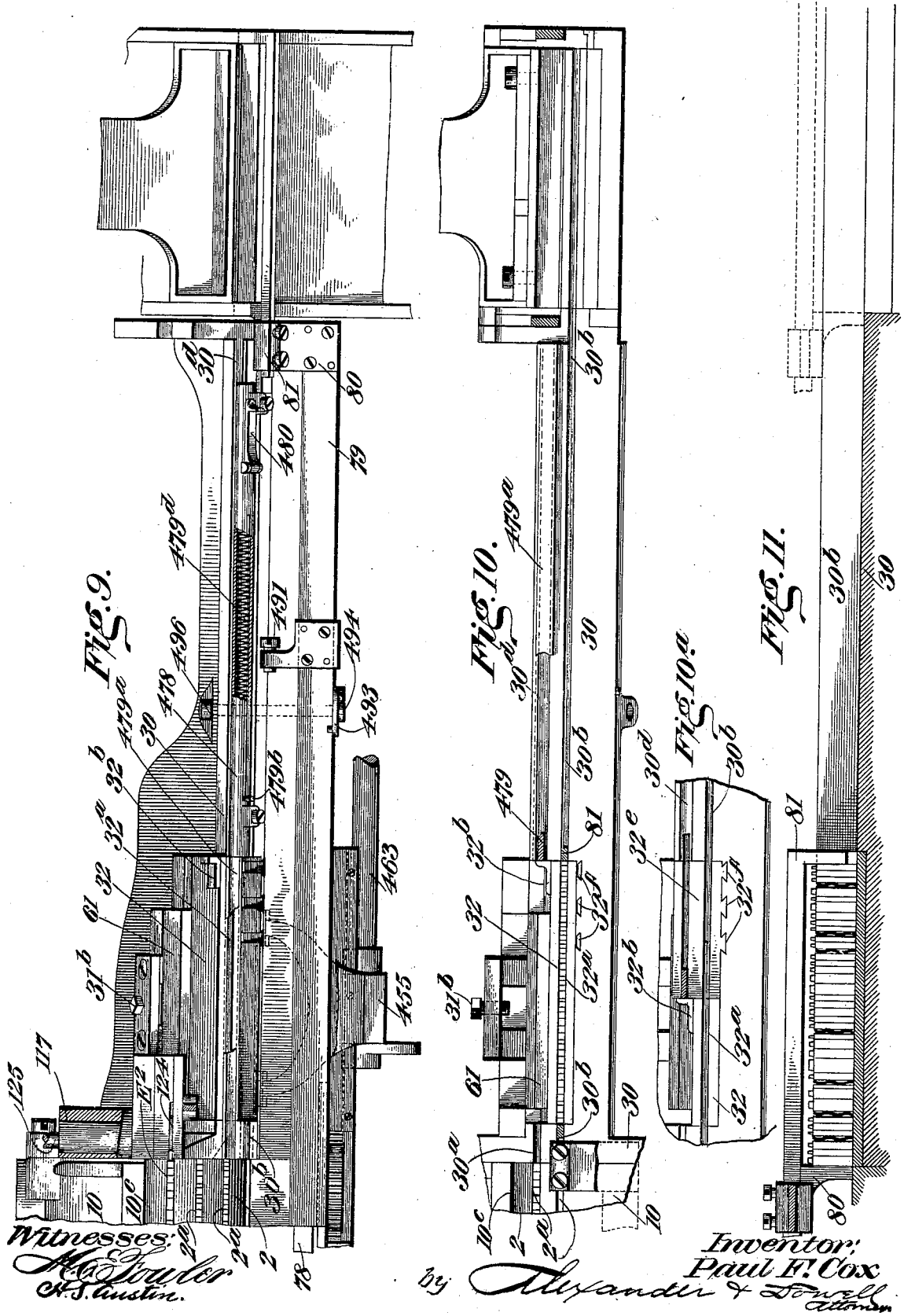

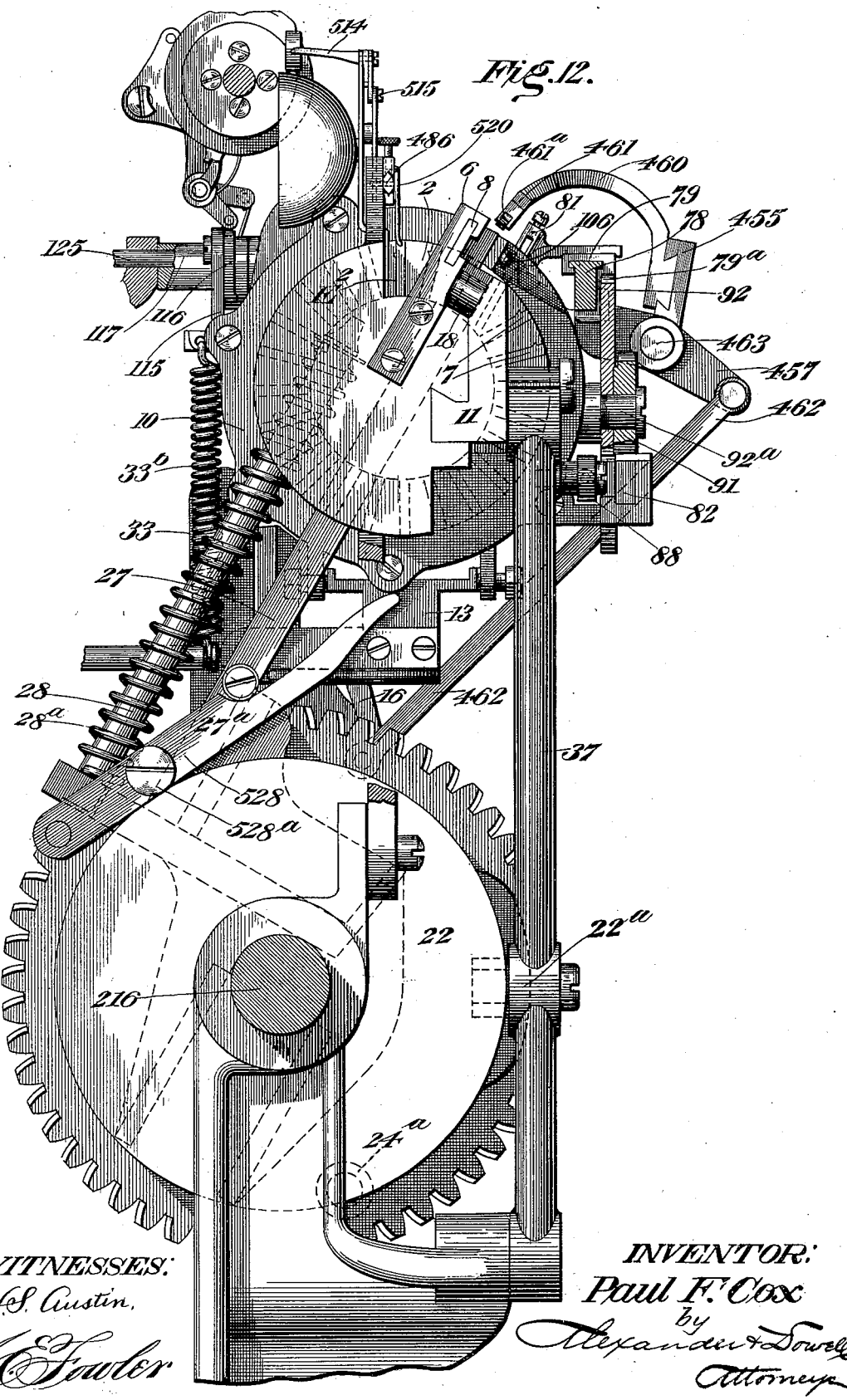

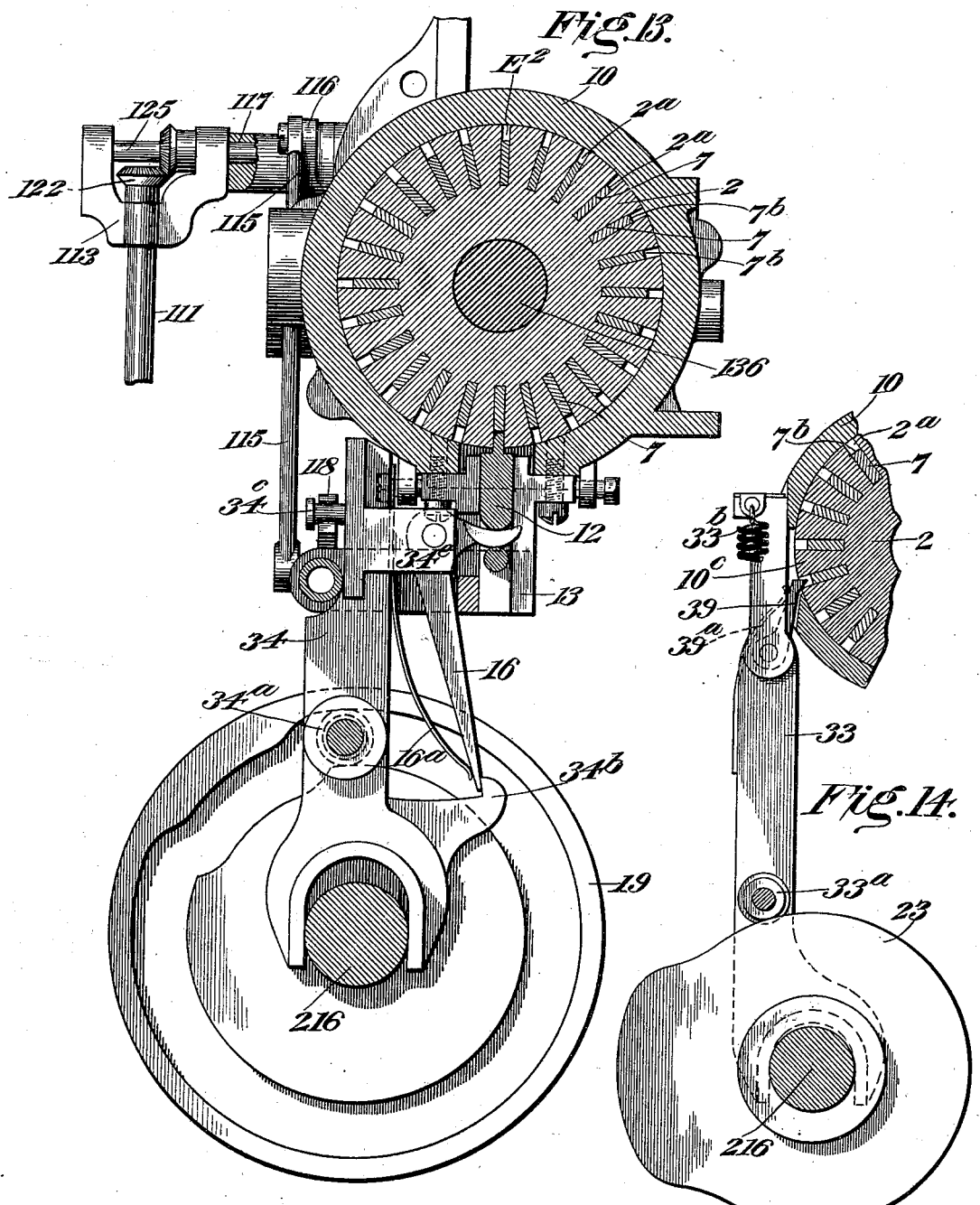

No. 646,358. Patented Mar. 27, 1900.
P. F. COX.
TYPE SETTING MACHINE.
(Application filed Aug. 14, 1899.)
(No Model.) 15 Sheets—Sheet 10.

WITNESSES:
H. S. Austin.
M. E. Fowler

INVENTOR:
Paul F. Cox
by Alexander & Dowell
Attorneys

THE NORRIS PETERS CO., PHOTO-LITHO., WASHINGTON, D. C.

No. 646,358. Patented Mar. 27, 1900.
P. F. COX.
TYPE SETTING MACHINE.
(Application filed Aug. 14, 1899.)

(No Model.) 15 Sheets—Sheet 11.

WITNESSES:
H. S. Austin.
M. E. Fowler.

INVENTOR:
Paul F. Cox
by Alexander & Dowell
Attorneys

THE NORRIS PETERS CO., PHOTO-LITHO., WASHINGTON, D. C.

No. 646,358. Patented Mar. 27, 1900.
P. F. COX.
TYPE SETTING MACHINE.
(Application filed Aug. 14, 1899.)
(No Model.) 15 Sheets—Sheet 12.

WITNESSES: H. S. Austin, M. E. Fowler

INVENTOR: Paul F. Cox
by Alexander & Dowell, Attorneys.

THE NORRIS PETERS CO., PHOTO-LITHO., WASHINGTON, D. C.

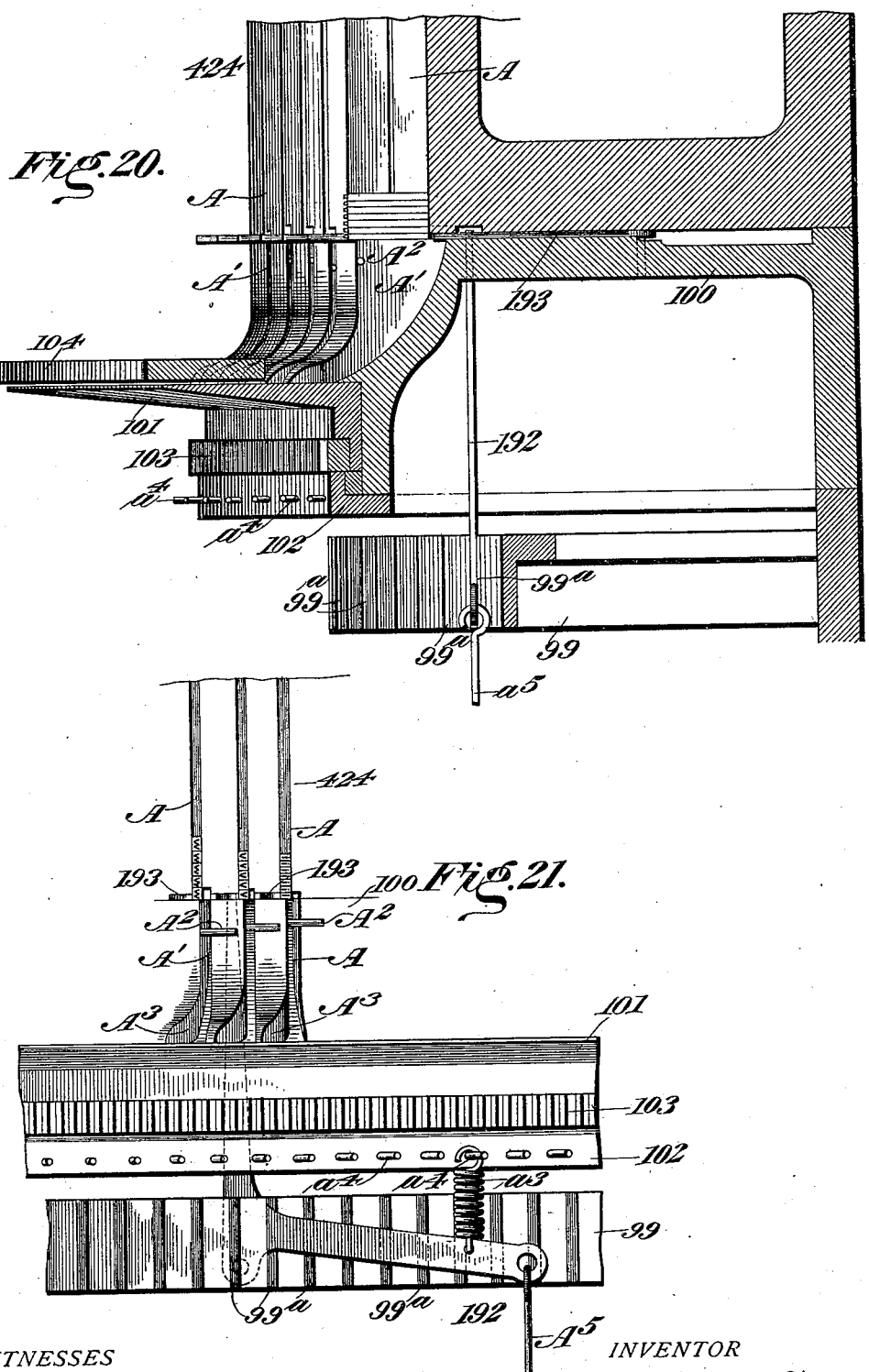

No. 646,358. Patented Mar. 27, 1900.
P. F. COX.
TYPE SETTING MACHINE.
(Application filed Aug. 14, 1899.)
(No Model.) 15 Sheets—Sheet 14.

WITNESSES
M C Fowler
H. S. Austin

INVENTOR:
Paul F. Cox
by
Alexander & Dowell
Attorneys

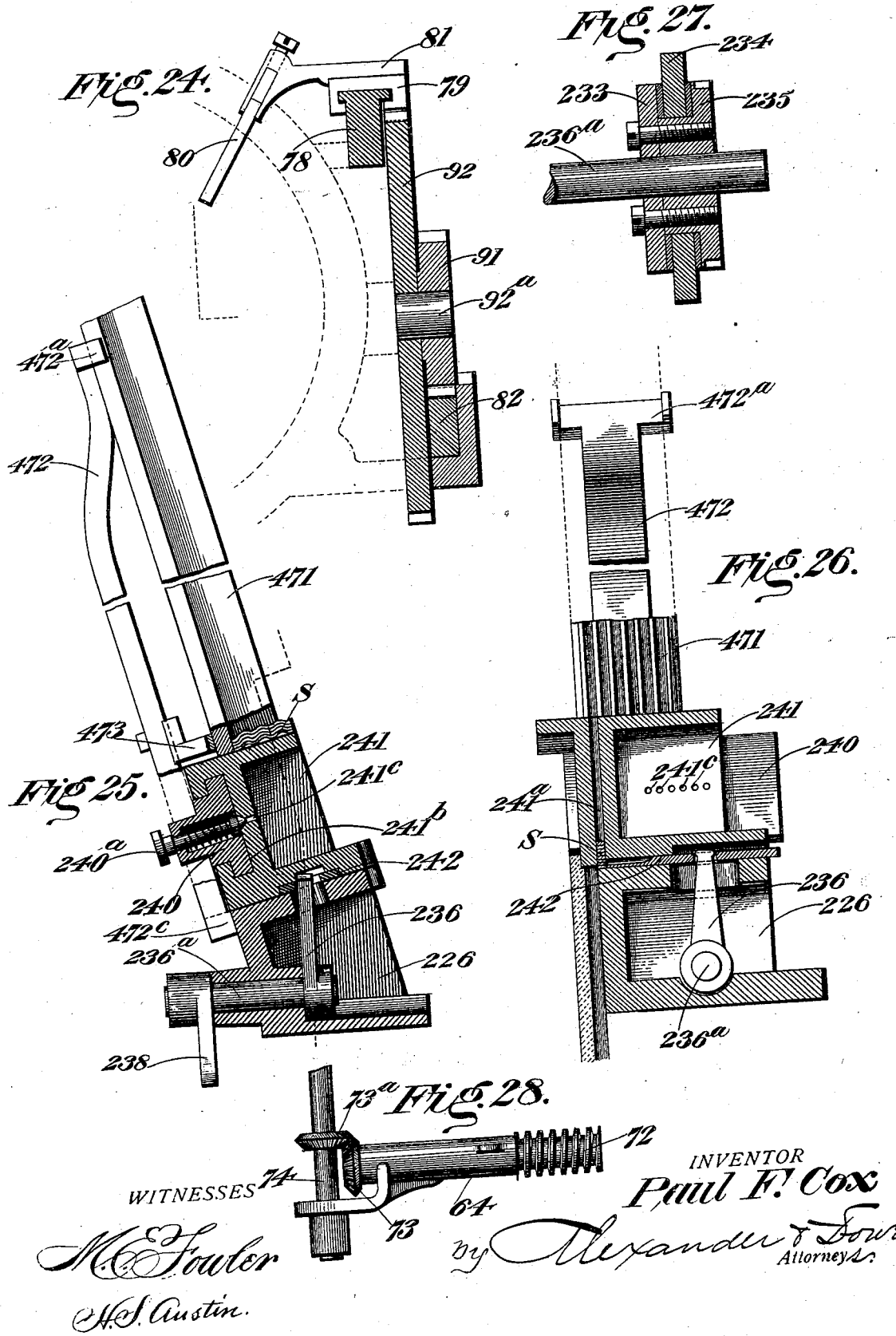

UNITED STATES PATENT OFFICE.

PAUL FLEMMING COX, OF MANCHESTER, CONNECTICUT, ASSIGNOR TO THE UNITYPE COMPANY, OF SAME PLACE.

TYPE-SETTING MACHINE.

SPECIFICATION forming part of Letters Patent No. 646,358, dated March 27, 1900.

Application filed August 14, 1899. Serial No. 727,095. (No model.)

*To all whom it may concern:*

Be it known that I, PAUL FLEMMING COX, of Manchester, in the county of Hartford and State of Connecticut, have invented certain new and useful Improvements in Type-Setting Machines; and I hereby declare that the following is a full, clear, and exact description thereof, reference being had to the accompanying drawings, which form part of this specification.

This invention is an improvement in type-setting machines, and relates particularly to that class of combined type setting and distributing machines commonly known as the "Thorne" type-setting machine, in which the apparatus for composing type from a stationary type-reservoir is combined with apparatus for automatically distributing dead-matter into the type-reservoir channels.

My invention embraces both means for composing type and means for distributing the same; but the present application will be restricted to the composing mechanism, while the distributing mechanism will form the subject of a companion application.

In the present invention I employ some of the principles and apparatus which have been heretofore patented by me and embodied particularly in Patents No. 528,856, dated November 6, 1894; No. 534,550, dated February 19, 1895; No. 581,954, dated May 4, 1897, and No. 601,498, dated March 29, 1898; and the present invention as covered in this application has for its object the production of a complete type-setting machine which embodies the following principal movements over my patents aforesaid, to wit: (*a*) improved means whereby the type may be ejected sidewise and face outermost from the reservoir, but turned end for end or inverted in dropping from the reservoir to the carrier, so as to be delivered feet first to the composing-point; (*b*) improved devices for composing the type and for justifying the type-lines by lineal compression; (*c*) improved mechanism for supplying compressible spaces to the composing mechanism as required; (*d*) novel line-indicating mechanism and novel space-indicating mechanism whereby the operator can determine when sufficient type has been set to form a line and whether such line is sufficiently compressible; (*e*) novel mechanism for transferring the justified lines to the galley, and (*f*) improved means for leading the lines, if desired.

The invention embodies various other novel features and combinations of parts, which will be hereinafter fully explained.

The invention is more concisely defined in the claims appended to this application.

In the accompanying drawings the improvements are illustrated as used in connection with a combined type setting and justifying machine of the Thorne type; but the invention is applicable to other forms of machines, and I do not limit myself to its use in connection with a cylindrical-type-reservoir machine such as is shown in the drawings.

Figure 16:
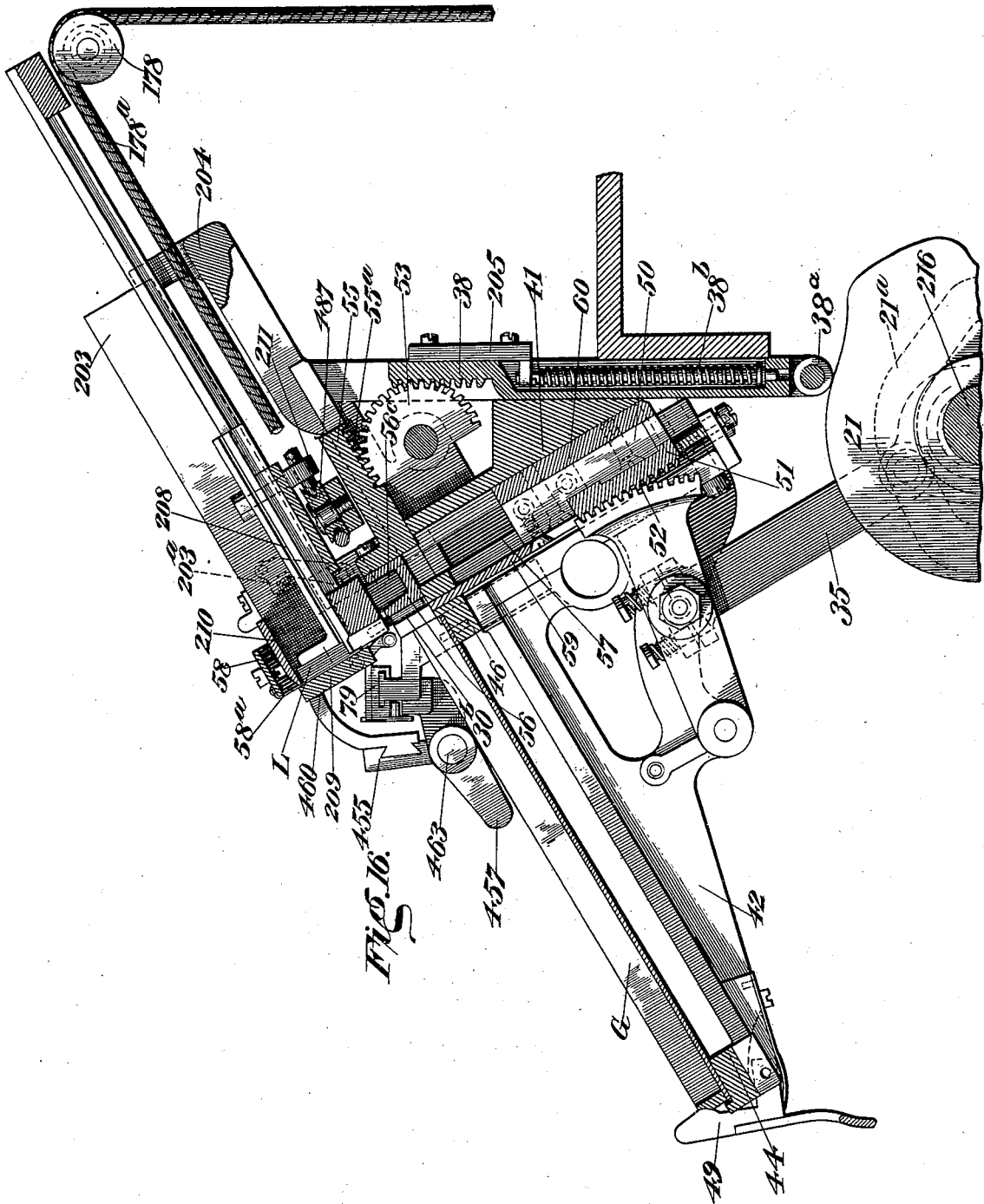
Figure 17:
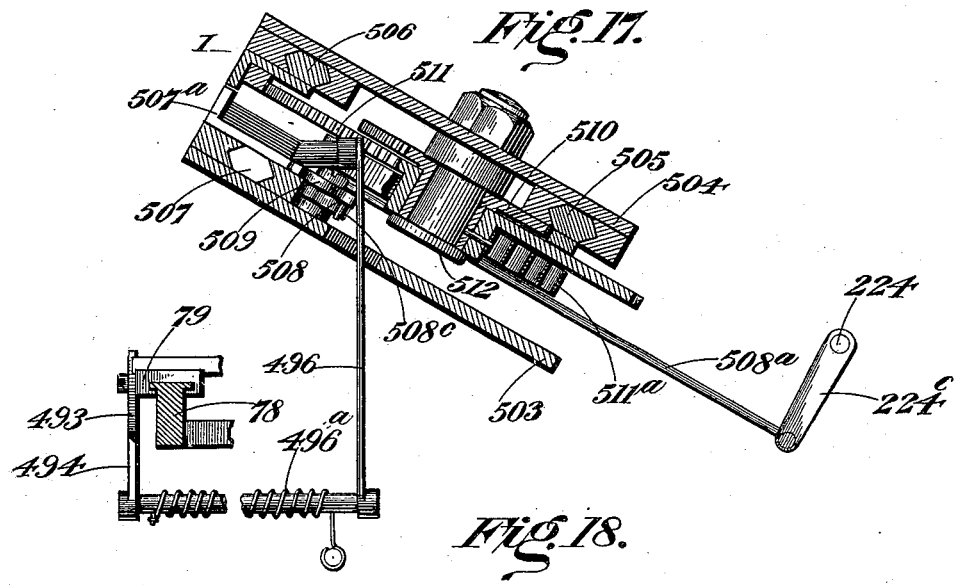
Figure 18:
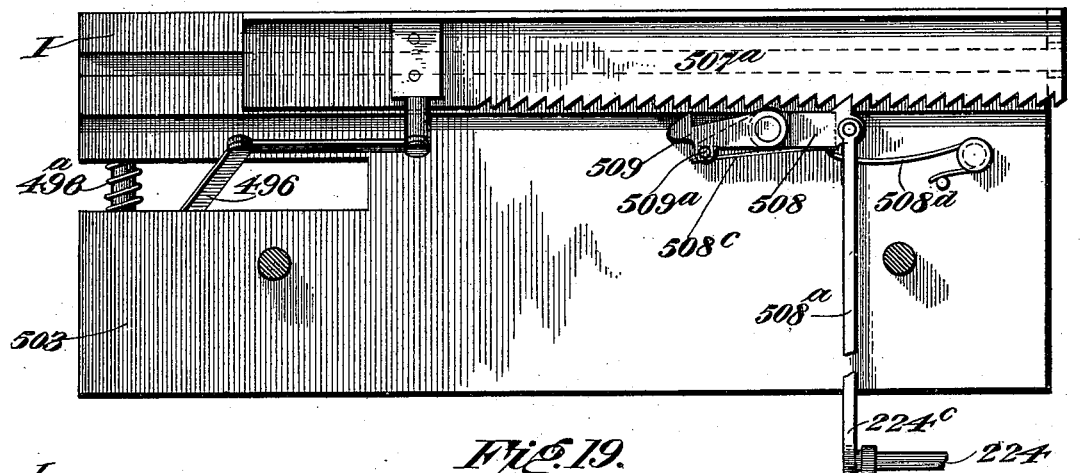
Figure 19:
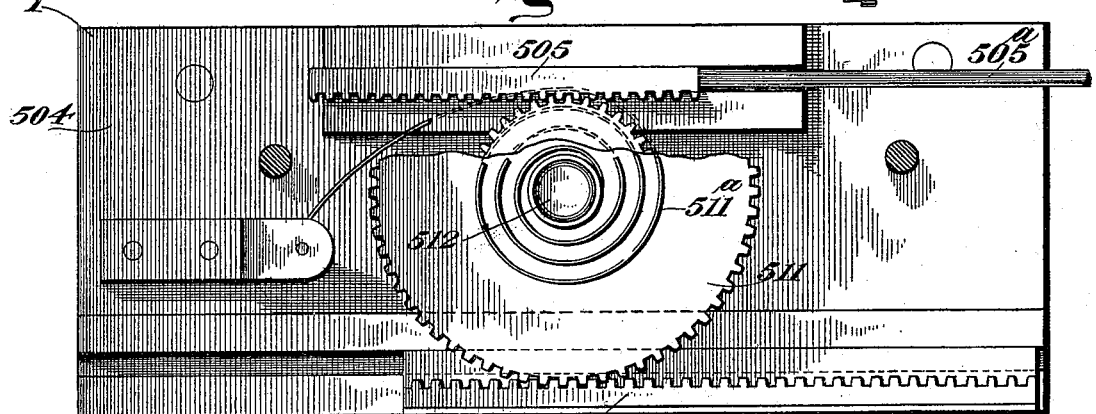
Figures 22, 23:
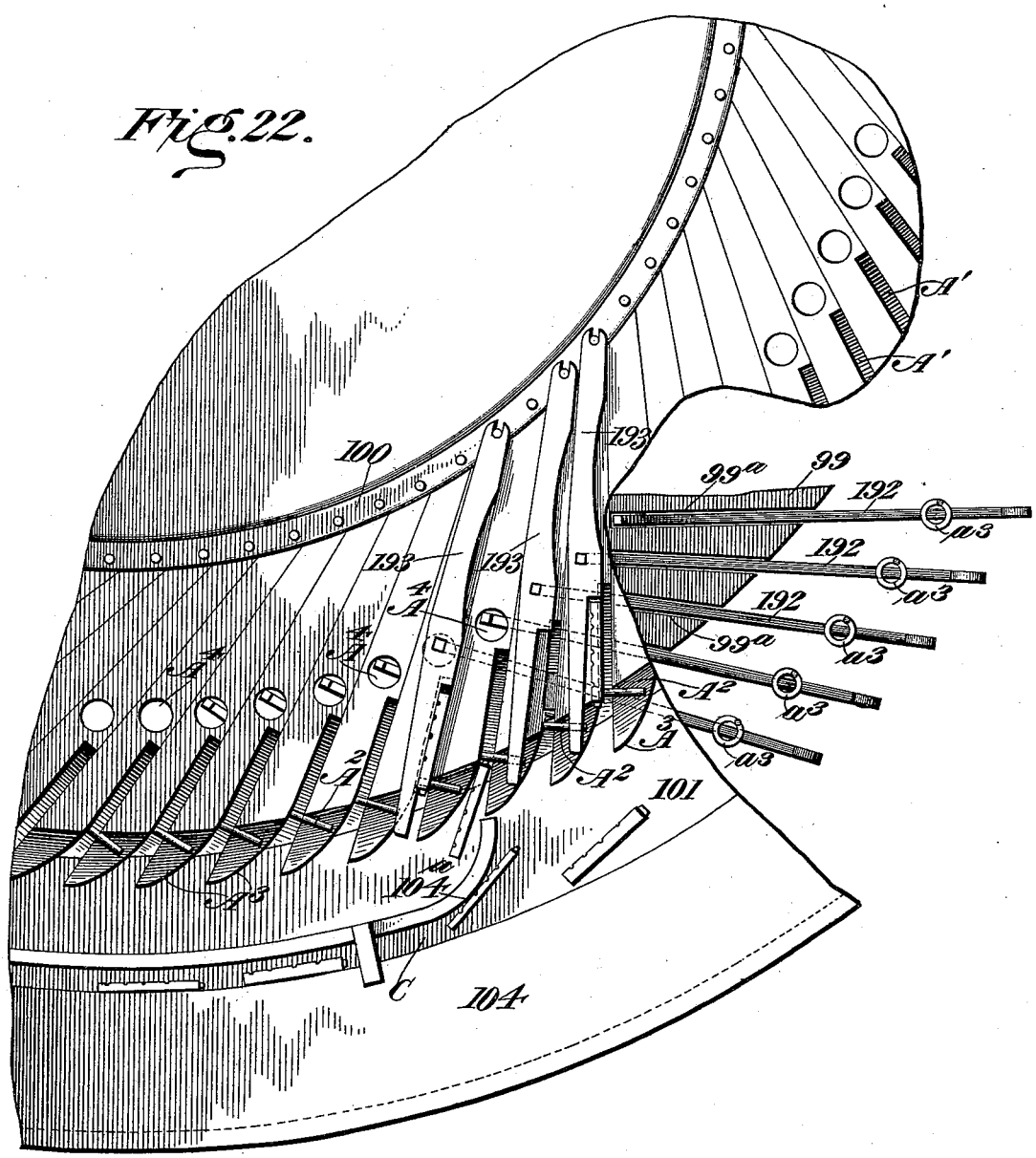

Referring to said drawings, Figure 1 is a side elevation of the complete machine. Fig. 2 is an enlarged detail front elevation of the same, the upper portion of the apparatus being broken away and the keyboard being removed. Fig. 3 is an enlarged detail front elevation, partly in section, of the composing portion of the apparatus, showing the space-feeding mechanism. Fig. 4 is an end elevation of Fig. 3, showing the space-feeding mechanism. Fig. 5 is an enlarged sectional elevation of the keyboard and of the justifying-mechanism-controlling devices. Fig. 6 is a detail view of the justifying actuating devices. Fig. 7 is a top plan view, partly in section, of the packing-cylinder and composing mechanism. Fig. 7ª is a detail view of parts 7 and 8. Fig. 8 is a front elevation of Fig. 7. Fig. 9 is a top plan view of the justifying and line-transferring mechanisms, said figure forming a continuation of Fig. 7. Figs. 10 and 10ª are detail top views, and Fig. 11 a detail sectional view, of the mechanism shown in Fig. 9. Fig. 12 is an enlarged end elevation of the justifying mechanism. Fig. 13 is a sectional view of the justifying mechanism, showing the packer-cylinder lock. Fig. 14 is a similar view of the packer-cylinder-rotating devices. Fig. 15 is a sectional elevation of the justified line-holder and the line-planer mechanisms. Fig. 16 is a vertical longitudinal sectional view through the galley-head. Fig. 17 is an interior view of the space-indicator. Fig. 18 is a similar view of the line-indicator. Fig. 19 is a transverse sectional view of the space and line indicator assembled in the case. Fig. 20 is a detail sectional elevation of the type reservoir and ejecting mechanism. Fig. 21 is a front elevation thereof. Fig. 22 is a detail plan view illustrating the type ejecting and carrying mechanisms, and Fig. 23 is a detail illustrating the turning of a type. Fig. 24 is a detail sectional view of the line-advancing mechanism. Figs. 25 and 26 are enlarged sectional views of the space-feeding mechanism. Fig. 27 is a detail section of the space-feeding friction-cam, and Fig. 28 is a detail of the adjustable worm.

*The type reservoir and ejectors.*—424 designates the type-reservoir, which is preferably a stationary upright cylinder provided with a series of vertical type-holding channels A, which are preferably cut at a tangent to the axis of the cylinder. A circular casting 100 is fixed below the reservoir 424, which may be supported thereon, said casting 100 being provided with a series of slots A', one for each channel A of the reservoir; but casting 100 is so fixed relatively to the casting 424 that the slots A' stand sufficiently to one side of the channels A to permit the lines of type in the channels A to rest on and be supported by the upper side of the casting 100, as indicated in Figs. 20 and 21; but the types can be ejected laterally from the channels A into the slots A' by a sidewise lateral movement. The lower edge of casting 100 flares outwardly and downwardly, as shown, and the rear walls of slots A' are similarly flared downwardly and outwardly, so that the types will not fall directly to the bottom of the slots, but will be directed outwardly and downwardly by reason of the curvature of the rear wall thereof. These slots A' are of the peculiar shape shown for the further purpose of assisting in turning the types end for end as they fall therethrough.

It will be observed that the types are placed in the channels A with their faces outward, and it is necessary that they should be delivered feet outward onto the carrier 101, which underlies the bottom of slots A'. It is therefore necessary to turn the types end for end as they pass through slots A', and this is accomplished by means of the catch-pins $A^2$ and the curvature of slots A' aided by the gravity of the type. These catch-pins $A^2$ transfix the slots A' a short distance below the channels A, so that as each type is ejected from the channel A its forward or face end will catch on the pin $A^2$ and be detained thereby until the bottom or base of the type has swung around the pin, as indicated in Figs. 21, 22, and 23. These pins, therefore, by arresting the face ends of the types, cause them to turn end for end in passing through the slots A', so that they descend feet outward onto the carrier 101, as indicated in Fig. 22. It will be observed by reference to Fig. 21 that the type face outwardly in the channels A and in the direction in which they are to be moved by carrier 101, and if ejected directly onto the carrier they would be carried face foremost thereon, and consequently would have to be turned bodily somewhere between the carrier and the composing mechanism or else their faces would be severely injured by blows and by composing them while resting on their faces; but by my improved construction I am enabled to put the type in the channel face outermost and yet deliver them on the carrier feet outermost by causing them to turn completely over end for end in passing through the slots A'. The pins and the rear walls of the slot are so relatively arranged that the face end of the type is upheld until the foot of the type has swung at least to a perpendicular under the pin, so that the type swings on the pins $A^2$ through an arc of at least ninety degrees, and necessarily must do so in order to be properly presented onto the carrier 101. This carrier 101 rotates in the direction of the tangential inclination of the slots, and to facilitate the escape of the type from the slots A' the mouth of each slot is widened and rounded on its exit side, as shown at $A^3$, so that the type may begin to turn and move with the carrier 101 before it entirely leaves the slot, which facilitates the proper delivery of the type to and prevents its binding or turning upon the carrier 101. This carrier 101 consists of an annular metallic ring, which is journaled upon a bearing on the casting 100 just below the slots A' and virtually forms the bottoms of the channels A. The carrier is provided with an annular gear 103, which may be formed on or secured to the carrier, as is most convenient, and the carrier and gear are supported on a fixed annulus 102, fastened to the under side of the casting 100, as shown. Gear 103 meshes with and is driven by a pinion 218 on a vertical shaft 219, which rises beside reservoir 424. The shaft 219 extends to the top of the machine, where it is driven by beveled gearing from a counter-shaft 428, which is provided with fast and loose belt-pulleys 429, whose belt can be shifted by means of shifting-lever 410, the handle of which depends within easy reach of the operator, who can thereby readily stop and start the machine at will. The type are ejected sidewise from the channels A by means of pivoted pushers 193, which lie parallel with the slots A' and between the top of casting 100 and the bottom of reservoir 424. The top of casting 100 may be channeled for the accommodation of these pushers, and the inner end of each pusher is bifurcated and embraces a pin $a$ on top of casting 100, by which the pusher is pivoted. The pushers are held in place and operated by the upper ends of bell-crank levers 192, which are pivoted at their bends to a plate 99, which is rigidly connected to and suspended from casting 100, as indicated in Figs. 20, 21, and 22. This plate 99 is provided with tangential slots $99^a$, in which the levers 192 are pivoted. The upper ends of the levers 192 are guided through openings A⁴ in casting 100, as shown, and their lower free ends are connected by springs $a^3$ to pins $a^4$ on ring 102, by which springs the levers and the pushers are retracted. The levers 192 are actuated so as to operate the pushers 193 by any suitable means and, as shown, the free end of each lever is connected by a wire $a^5$ (which passes through an opening in the top of the stand 98 upon which the machine is mounted) to the short arm of a small bell-crank 184, pivotally attached to the under side of said stand, the longer arm of each crank-lever 184 being connected by a wire $a^6$ to the lower end of a pivoted lever 183, to the upper end of which is connected a sliding bar 182, that extends under the keyboard 181 of the apparatus and is provided with a notch $b$, adapted to be engaged with any one of the ribs $b'$ of a continuously-rotating cylinder 169. The forward end of slide 182 is thrown upward by the action of a spring 182ª, attached to its inner end and to the lower end of lever 183, as shown; but slide 182 can be depressed into engagement with a rib $b'$ by depressing the corresponding finger-key B, mounted on the keyboard 181. Each time notch $b$ engages a rib $b'$ slide 182 will be pushed forward, thereby rocking said lever 183 and causing the ejection of a type through the above-described connections. (See Figs. 5, 21, and 22.)

The ejected type are delivered onto the carrier 101 and carried thereon around the reservoir, being kept on the carrier by means of the guide-ring 104. This guide-ring is provided at one side with a deflecting-rib 104ª, which prevents any type being carried continuously around the ring, and the space between the outer side of rib 104 and the inner periphery of the ring forms a type-guide slot C by which the type are directed into the upper end of the vertically-disposed type-channel D, by which they are directed to the assembling or composing point.

That portion of channel D by which the direction of movement of the type is changed from horizontal to vertical preferably has its inner wall formed by the periphery of a disk or wheel 587, which is mounted on a counter-shaft 588 and driven by bevel-gears 590 from a counter-shaft 591, which is driven by a gear 235, forming part of or attached to the friction-clutch of the space-feeding mechanism, hereinafter referred to. Wheel 587 also keeps channel D clean, carrying the dirt and dust out of the channel, and thereby preventing choking thereof.

*The packing-cylinder and justifying mechanism.*—Preferably the type is delivered from channel D directly into one of a series of radial channels 2ª in a rotatable line-holder (or packer-cylinder) 2, which is in general similar in construction and mode of operation to that shown in my Patent No. 581,954, dated May 4, 1897.

The setter 124, by which the types are directed into the channel 2ª, is mounted on a shaft 125, which is journaled eccentrically in a rocking bearing 117, that is provided with an arm 116, connected by a rod 115 to a rock-lever 118, which is operated by a pin 34ᶜ on the upper end of the push-bar 34, that operates the lock 12 of the packer-cylinder, hereinafter described. Bearing 117 will therefore be rocked so as to withdraw the setter 124 from the channel 2ª before the packer-cylinder is moved, and after the packer-cylinder is stopped simultaneously with the locking thereof by bolt 12 bearing 117 will be rocked, so as to return the setter 124 into position to push the types into the channels 2ª. The setter-shaft 125 is driven by means of bevel-gears 122 from a vertical shaft 111, which is journaled at its upper end in a yoke 113, hung upon shaft 125, and its lower end is journaled in a rock-nut 114, suitably journaled on the frame or a bracket attached thereto, and shaft 111 is driven by a pulley 112 and belt 112ª from a pulley 110 on the vertical shaft 219. At the lower end of the channel D and just above the setter is pivoted a type-smoother 121, which will prevent the type being knocked out of the slot by their impact against the setter 124 and will pat down the type into the channel 2ª and smooth or aline the type therein as they are pushed forward by the setter. The smoother 121 is pivoted over the type-channel in such position that each incoming type strikes the same and throws it up, so that it falls by gravity upon the type below, giving them a series of gentle taps, whereby they are alined. This little device I have found very efficient in practice in preventing choking and jumping out of the type at the point where they are fed into the channels 2ª by the setter. This device, furthermore, operates to automatically choke the throat of the channel and prevent the lighter letters from turning around. It is so pivoted that it opens up for the thicker letters and automatically adjusts itself in the throat. Preferably I face the lower weighted end of this smoother 121 with a fibrous shoe 121ª.

The packer-cylinder 2 is journaled on a shaft 136, fixed within a cylindrical casing 10, made fast to the frame of the machine at a point just below and to the left of the lower end of type-channel D, and to the outer (left) end of casing 10 is secured a casting 1. (See Figs. 2, 7, 8, and 12.) In each of the longitudinal peripheral channels 2ª of this packer-cylinder 2 is a sliding follower 7, provided with a friction-spring 7ª to retard its movement therein, said followers being slightly longer than the packer-cylinder 2.

Each follower 7 is adapted to be pushed out over casting 1 by the incoming type-line fed into its channel 2ª by the setter 124. The followers 7 are also cut away on their outer edges, as shown at 7ᵇ, leaving a projection 7ᶜ on the rear end of the follower, which is adapted to be engaged by a retractor-bar 8, for the purpose hereinafter explained. As soon as sufficient type have been fed into one channel $2^a$ to form a line, the packer-cylinder 2 is shifted, so as to move the filled channel out of register with channel D and bring an empty channel into register therewith, the channels $2^a$ being filled successively, and the packer cylinder being rotated intermittently, so as to move the filled channels out of register with the channel D and successively into position to be acted upon by the line-compressing mechanism, which mode of operation is substantially the same as that described in my Patent No. 581,954 aforesaid. In the present case, however, instead of the line being moved directly into the galley from the packer-cylinder and justified in the galley it is first ejected from the rotary packer-cylinder into a line-holder 32, wherein the line is justified and from which it is eventually removed and transferred to the galley by a line-transferrer 81, as hereinafter described.

The packer-cylinder is moved intermittently by means of a pawl 39, which successively engages the slots $2^a$ (see Fig. 14) through an opening $10^c$ in the rear wall of casing 10. This pawl 39 is pressed inward by the spring $39^a$ and is mounted upon a vertically-movable bar 33, which is forked over shaft 216 and is provided with a roller $33^a$, adapted to engage a peripheral cam 23 on shaft 216, as shown. The roller $33^a$ is held against the cam by means of a spring $33^b$, as indicated in the drawings.

After each movement of the packer-cylinder 2 it is locked during the setting of a new line by means of the bolt 12, (see Fig. 13,) which is secured in a holder 13, adjustably secured under an opening in the bottom of the holder 10. Bolt 12 rests upon the short arm of a bell-crank lever 16, which is pivoted at its bend between lugs $34^c$ on the upper end of a slide 34, the lower end of which is bifurcated to embrace shaft 216 and is provided with a roller $34^a$, which engages a side race-cam 19 on shaft 216, as shown. The long arm of lever 16 is pressed outward by a spring $16^a$, attached to slide 34, but is limited in its outward movement by a hook $34^b$, (see Fig. 13,) the construction being such that if for any reason the tooth of bolt 12 should not directly engage with one of the slots $2^a$ of the packer-cylinder (as it must do in order to properly lock the latter) the spring $16^a$ would yield, and thus prevent breakage of the parts.

Attached to the casting 1 is a sliding bar 486, which stands in line with the channel in which the types are being assembled, and this bar 486 is provided with an adjustable tappet 520, which depends into position to be struck by the end of the outcoming follower, which is ejected from the line by the incoming type. This bar 486 is connected by a trip-lever and catch 515 to a hammer 514, which is adapted to sound a gong and give an audible alarm when sufficient type have been assembled to make a line. The bar 486 is also connected to a visual line-indicator, hereinafter described.

Slightly in advance of the bar 486 and in position not to interfere with the outcoming follower is a sliding follower, retractor, or pull-bar 8, the rear end of which is supported in a guide 6, attached to the end of casting 1, and the front end is guided in a slot $10^a$ in the end of casting 10 and is supported therein by a pin $10^b$, playing through a slot $8^a$ in the end of the pull-bar 8. This end of the pull-bar is provided with a downwardly-projecting lug $8^b$, which is adapted to be engaged by the upwardly-projecting lug $7^c$ of any follower 7 when the latter is pushed completely forward, so as to eject the composed line from the packer-cylinder and justify the same in holder 32. In order to justify the line, it is necessary that the follower 7 be pushed forward, so as to cause its inner end to project beyond the inner end of the packer-cylinder to insure that the type-line shall be fully removed from the packer-cylinder and properly entered within the justifying-holder 32. Consequently some means must be provided for withdrawing the follower back into the packer-cylinder, else it would lock the packer-cylinder to the justifying-holder, which would cause a break; but by means of the pull-bar 8 (actuated by the justifier-head 11) each follower is fully retracted into the packer-cylinder before the latter is rotated.

Mounted so as to slide longitudinally on the casting 1 is a justifier head or block 11, which is reciprocated back and forth at the proper times by means of a lever 37, pivoted on the main frame and provided with a roller engaging a peripheral race in a cam 22, mounted on a shaft 216, journaled in the main frame, and from which shaft the line justifying and transferring mechanisms are driven. This cam 22 is so timed as to move the head 11 forward each time a line is to be justified, and then quickly retracts the same into the position shown in Fig. 2. The head 11 is provided with a friction-roller 18, which is adapted to be engaged by the justifying-wedge 27, which works through a transverse groove $1^c$ in casting 1 at right angles to the head 11. The wedge 27 is mounted on a yoke 26, (which embraces shaft 216, so as to be guided thereby.) This yoke is provided with a lateral offset rib $26^a$, which is adapted to be engaged by a roller $24^a$ on a worm-gear 24, (keyed to a shaft 216, beside cam 22, as shown.) This roller will operate the wedge once for each rotation of the worm-gear. The wedge is retracted and pressed downward at all times by means of a stout spring $28^a$, interposed between the outer end of the extension $26^a$ and a socket in casting 1, as shown in the drawings, said spring being guided by a rod 28. The yoke 26 is so arranged that it is released very quickly by the roller $24^a$, and in order to prevent pounding or injury to the parts by the sudden descent of the wedge I preferably employ a cushioning device, as illustrated in Fig. 12, to graduate the descent thereof. This wedge-cushioning device consists of a lever 528, pivoted on a stationary support beside cam 22, and projecting upward beside the wedge 27. The upper end of the lever is slightly curved and stands in position to be engaged by the roller 27$^a$ on the wedge. The lever is provided with a roller 528$^a$, which engages a raised cam 22$^a$ on the periphery of cam 22, cam 22$^a$ being so arranged that lever 528 will be caused to follow up the roller 27$^a$ as the wedge 27 rises, and will then gradually let the lever down after the wedge is released by pin 24$^a$ and bears upon lever 528, lever 528 permitting the wedge 27 to be gradually pushed down by the spring 28$^a$.

It will be observed from the foregoing description that the mechanisms for rotating and locking the packer-cylinder, for actuating the followers therein, and for actuating the justifying-head and the justifying-wedge are all much similar in principle and mode of operation to the devices shown in my Patent No. 581,954, but embody improvements upon the construction shown in the said patent. I do not therefore consider it necessary to enter herein into a more detailed explanation of the mode of operation of these mechanisms.

The casing 10 has an opening 10$^c$ in its upper side, whereby channels 2$^a$ of the rotary holder can be seen, and thus the operator can always see the line of type being composed, the line of type ready for correction, and the line of type ready to be justified.

Upon the completion of a line the line shifting and justifying mechanisms are set in motion and caused to perform a cycle of operations by setting in motion shaft 216, which is released and permitted to make one revolution by depressing the controlling-lever 196 beside the keyboard 133. This lever 196 is a bell-crank lever, and its shorter arm is connected by link 71 to an arm 67 on a rock-shaft 66, on which is another arm 67$^a$, connected by a link 65 with a swinging bracket 64, in which is journaled the shaft 72$^a$ of a worm 72, which is, when the bracket 64 is elevated, to engage a worm 24 on shaft 216 and rotate the latter. The bracket 64 is hung upon a shaft 74, and on the end of the worm-shaft 72$^a$ adjoining shaft 74 is keyed a bevel-gear 73, which meshes with a small bevel 73$^a$ on shaft 74, and shaft 74 is driven by bevel-gears 74$^a$ and 74$^b$ from the vertical shaft 219, as shown, the lower end of shaft 219 being stepped in a bracket 77, as shown. The gear 73 will remain in engagement with 73$^a$, but permit the casting 64 and worm 72 to swing on the shaft 74. The worm 72 is normally held depressed out of engagement with gear 24 by its weight supplemented by a spring 66$^a$, operating on shaft 66, as shown in Fig. 5, but when raised into engagement with gear 24 is locked in its raised position until it has caused gear 24 and shaft 216 to make one complete revolution by the following automatic devices: The link 65 is provided with a lateral side pin or lug 65$^a$, which projects beside a depending catch 70, hung from a bracket on the frame and pushed outward by a spring 70$^e$. This catch 70 is provided with a hook 70$^a$, adapted to catch under stud 65$^a$ when link 65 is elevated and uphold the latter, thus locking the worm 72 in mesh with the gear 24. As the shaft 219 is a continuously-driven shaft, the worm 72 rotates all the time and as soon as it is engaged with gear 24 immediately begins to rotate the latter and shaft 216 and actuate all the cams, &c., connected to said shaft. Attached to the inner face of worm-gear 24 is an adjustable lock-throw-out plate 25, which carries a pin or roller 25$^a$, which just as the gear 24 and shaft 216 have about completed one revolution strikes the beveled lower end 70$^b$ of the latch-lever 70 and forces the latter outward, thereby releasing lug 65$^a$ from the catch 70$^a$, whereupon the worm 72 drops by gravity, aided by the spring 66$^a$, out of engagement with the gear 24, and the shaft 216 instantly stops until the worm 72 is again thrown into mesh with gear 24 by the depression of lever 196.

On the inner end of shaft 74 is fixed a pinion 74$^c$, which drives a larger pinion 175, having a belt-groove on its hub, by which power is transmitted by belt or cord 172$^a$ to a pulley 172 on the end of the rib-drum 169, by which the type-ejecting mechanism is actuated.

*The justified-line holder.*—As above stated, the types are assembled in one channel 2$^a$ of the packing-cylinder 2, and the composed line is then moved out of the way by partly rotating the packer-cylinder to bring an empty channel 2$^a$ in position before the setter. At the next movement of the packer-cylinder such composed line is brought into register with a slot 30$^a$ in the circular end wall 30$^d$ of a casting 30, which is fastened onto the inner end of casing 10 and fits closely thereto, as shown. (See Figs. 1, 9, and 10.) At the side of wall 30$^d$ opposite the packer-cylinder is a movable line-shifting device or line-holder 32, having a single longitudinal channel 32$^a$, which is adapted to register alternately with the slot 30$^a$ and with a slot 30$^b$ in the wall 30$^d$ in front of the slot 30$^a$. The composed lines are held by holder 32 during the process of justification by lineal compression. The holder is formed of a plate 32, corresponding in length to the length of the justified line. The holder 32 is preferably removably attached to a slide 61, that is mounted in a bracket 31, which is supported on the casting 30, and is provided with journal-bearings for the end of a rock-shaft 62, that extends substantially parallel with the shaft 216 toward the right-hand end of the machine, and on this rock-shaft 62, between the bifurcations of casting 31, is secured a toothed sector 54, which meshes with a toothed rack 61$^a$ on the under surface of plate 61, so that when shaft 62 is rocked plate 61 will be reciprocated. Adjusting-screws 31$^b$ and 31$^c$, tapped through lugs on casting 30, may be used to limit or regulate the extent of movement of plate 61. The shaft 62 may be operated at the proper time from a race-cam 20 on the shaft 216, which is engaged by a roller 36ª on a push-bar 36, yoked on the shaft and connected at its upper end to a crank-arm 63 on shaft 62. (See Figs. 2 and 15.) Preferably casting 32 is dovetailed, and its rear edge engages a dovetailed flange on the upper side of plate 61, while its front end is engaged by a screw 32ᵉ, tapped through a lug on plate 61, as shown. I prefer to removably attach holders 32 to plate 61 and to provide interchangeable holders 32 for different length lines.

A follower 479 is arranged to move within the channel of holder 32 and is mounted upon the outer end of a sliding bar 479ª, which is guided in a longitudinal groove 30ᵈ in the casting 30, and to this bar is fixed a pin 479ᵇ, which enters a slot in a tube 478, containing an extensible coiled spring 479ᵈ, which will act to normally project the bar toward the packing-cylinder, and thus move follower 479 toward the slot 30ª, but will permit the follower 479 to be pushed back and out of the channel in holder 32 by the incoming line of type which is injected into the holder 32 from the packer-cylinder 2 through the slot 30ª.

480 is a latch pivoted on casing 478, by which bar 479ª can be locked in the casing 478, so as to hold plunger 479 out of the way while holder 32 is being changed or replaced.

The holder 32 exactly corresponds in length to that of the line when justified, and the parts are so proportioned that the wedge-head 27 will cause the followers 7 to move so far inward that they not only eject the line from the packer-cylinder 2 through the slot 30ª into the holder 32, but also push the line entirely into said holder, justifying it by lineal compression in so doing. The actuating parts are so arranged that the follower 7 will stop just when it has pushed the line of type completely into the holder 32, thereby justifying the same by lineal compression, and this leaves the inner end of the follower 7 exactly flush with the end of the holder 32, so that type shall not project from the holder 32 into the slot 30ª, so as to lock the holder 32 to the casting 30, and so that the follower 7 shall not project from slot 30ª into the holder, so as to lock the latter to the former. As a line of type is thus moved into the holder 32 it forces the follower 479 out of the same, the latter moving outward until its movement is positively arrested, which will occur just when it is entirely clear of holder 32, so that it will not prevent movement of the latter and will effectually close the end of the channel 32ª therein, so that no type will catch between the holder and the fixed casting. As soon as the line is fully justified and entered within the holder 32 the latter is rocked forward, so as to transfer the line of type from the point of register with the slot 30ª into register with slot 30ᵇ and a channel 30ᶜ, which leads onward to the galley at the right-hand end of the machine, a line-transferrer 81 being in position in channel 30ᶜ to remove the line of type from the holder and transfer it to the galley-head.

To prevent the follower 479 falling back behind the line-holder 32 when the latter moves forward to carry the justified line to channel 30ᶜ, projections 32ᵇ are made or secured to the holder 32, which will hold plunger 479 until the holder 32 is moved back into position to register its channel with the slot 30ª.

*The justified-line transferrer.*—The line-transferrer consists of an adjustable L-shaped bar 81, the long arm of which is adjustably connected to a fixed arm 80, attached to a slide-bar 79. The bar 81 is adjustable toward or from the arm 80, as in a printer's stick, so that the line-transferrer can be adjusted to receive any desired length of line between the end of bar 81 and arm 80. The slide-bar 79 is mounted upon a flanged or T bar 78, rigidly attached to the straight front edge of casting 30, as indicated in the drawings. The slide 79 is provided with a rack 79ª, which is engaged by a large pinion 92 on a stud-shaft 92ª, attached to the casing 10, and the pinion 92 is attached to a smaller pinion 91, which meshes with a sliding rack 82, that is connected by a link 88 to the upper end of the lever 37, which actuates the justifying-head 11, so that the slide 79 is controlled by and from the wedge-head 11. Owing to the difference in the relative diameters of the pinions 91 92 a slight movement of bar 82 imparts a much greater movement to slide 79. As the line is pushed from the packer-cylinder 2 into the holder 32 by head 11 the slide 79 is moved rapidly to the left, so as to move the line-transferrer 81 in channel 32ᶜ to a position directly opposite the justifier 32. (See Figs. 10 and 11.) Then while slide 79 is at rest the holder 32 is moved outwardly, so as to move the justified line into register with the channel 30ᶜ of casting 30. Then while holder 32 is momentarily at rest the head 11 starts backward, and in so doing imparts a rapid movement to bar 79 in the opposite direction, which action causes the line-transferrer 81 to move the justified line out of holder 32 into the channel 30ᶜ and on toward the galley hereinafter described.

The slot 30ᵇ enables the left-hand or short arm of bar 81 of the line-transferrer to take up a position where it will be behind the line of type brought forward by the holder 32, and the correct position of the transferrer 81 is insured by means of an adjustable bolt 491, secured to a bracket on slide 79 and adapted to engage a fixed stop on the casing 10 or other convenient point of the machine. If it is desired to justify shorter lines, the holder 32 may be removed and a shorter holder substituted. This can be done with great facility, but when done it is necessary to lengthen the channels 30ᵈ and 30ᵇ, which may be done by means of removable channel-blocks 32ᶜ, which can be attached to the casting 30 by means of interlocking dovetailed grooves and flanges 32$^f$ on casting 30 and blocks 32$^e$, (see Figs. 10 and 10$^a$,) such interlocking ribs and flanges being formed on the castings 30 and 32$^e$ for this purpose. In such case it is also necessary to adjust the length of the line-transferrer, which can easily be done by loosening the screws in the head 80 and sliding bar 81 inward.

To prevent accidental irregularity or unevenness in the height of the type-faces in the justified line, I provide a line-planing or typealining device which comes into operation just before and during the period of justification. This device consists of a bar 461, attached to a yoke 460, which is detachably connected by a dovetailed joint to a rock-arm 455 on the shaft 463, which shaft is journaled in a bracket 456 and is operated by a crank-arm 457, connected by a link 462 to a lever 458, pivoted on a bracket 459 and operated by a pin 20$^a$ on end of cam 20. When the pin operates lever 458, the line-planer is lowered, so that it levels the line of type and also holds the same firmly during the time of justification thereof. As soon as the line is justified pin 20$^a$ disengages lever 458, and the latter is immediately thrown back by a spring 458$^a$, the throw of the lever being regulated by a set-screw 450$^b$, (see Fig. 15,) and thereby the planer-bar 460 is thrown up, so as not to interfere with the movement of the type-line by holder 32.

The planer-bar 461 may be provided with a series of small rollers 461$^a$, as shown in Fig. 12, which will facilitate the movement of the type thereunder.

I have thus far described the mechanism for ejecting type from the reservoir, for assembling the same in the channels of the packing-cylinder, for giving an intermittent partial rotary movement to the packing-cylinder, so as to shift a channel containing a line of type out of register with the assembling-channels and bring an empty channel into register therewith, also the means for locking the packing-cylinder after each intermittent movement, the means for ejecting a previously-composed line from the packing-cylinder into the justifying-holder and justifying the line therein by lineal compression, and the means for moving the justified line into position to be taken by the transferring mechanism to the galley. In order that the lines may be compressed lineally, it is necessary that compressible spaces be used, and I prefer to employ compressible spaces such as are shown in my Patents No. 528,857, dated November 6, 1894; No. 534,550, dated February 19, 1895, and No. 581,954, dated May 4, 1897, which spaces, however, are preferably cast like the ordinary type-spaces, but are contained in an independent reservoir and fed therefrom, as required, into channel D, substantially as described in my application Serial No. 725,196. Therefore before proceeding to describe the mechanism by which the lines are leaded and arranged in the galley I will describe the space-feeding mechanism

*Space-feeding mechanism.*—In the plate or casting in which channel D is formed is another channel $d$, which communicates with channel D at its lower end, and is widened at its upper end and communicates with a space-feeding channel 241$^a$ in a casting 241, which is supported upon a casting 226, attached to the frame just behind the plate containing the channels D $d$. The casting 241 is provided on its rear side with a grooved guideway 241$^b$ for the reception of a slide 240, to which is attached an upright space-galley-supporting bar 472, provided with a bracket 473 near its lower end and with a bifurcated upper end 472$^a$, together adapted to hold and support a space reservoir or galley 471, which has a series of longitudinal channels, each adapted to contain a supply of crimped compressible spaces S, as shown. The bar 472 extends below the plate 240 and has a foot 472$^c$, which fits close against the face of casting 226 and steadies the bar 472. Plate 240 permits the space-reservoir 471 to be shifted upon bracket 241, so as to bring any one of its channels into register with the channel 241$^a$, as indicated in the drawings. The plate 240 is provided with a spring-actuated pin 240$^a$, adapted to engage any one of a series of holes 241$^c$ in casting 241, so as to lock the space-reservoir in any position to which it is adjusted, with some one of its channels registering with the channel 241$^a$. (See Figs. 25 and 26.)

242 is a space-ejector resting upon casting 226 and guided in a recess in bottom of casting 241 and lying in position to operate on the lowermost space in channel 241$^a$, so as to eject the lowermost space laterally therefrom into the upper end of channel $d$. This ejector is actuated by means of an arm 236 on a rock-shaft 236$^a$, journaled in casting 226 and carrying another arm 238, which is provided with a friction-roller that rests upon and is adapted to be actuated by a rotatable cam 234, which is operated when permitted by rotating friction-disks, but is locked at each revolution by means hereinafter described. The arm 238 is pressed down against cam 234 by a spring 239$^a$, interposed between the arm 238 and a bracket or lug 475 on casting 226, the spring being guided by a pin 239, as shown. The cam 234 is supported by and clamped between adjustable friction-plates 233 and 235, keyed upon a shaft 232, which is driven by means of a worm-gear 231 from a worm 227 on a shaft 227$^a$, which is journaled in brackets 200 on the main frame and is driven by intermeshing pinions 227$^b$ and 229 from a shaft 199, parallel with but below shaft 227$^a$, shaft 199 being driven by bevel-gears 197 and 197$^a$ from the main shaft 219, as shown. The cam 234 is preferably provided with a series of holes 234$^a$, with either of which may be engaged pin 234$^b$, which pin is adapted to engage with a double-armed spring-actuated stop-lever 222, pivoted at its bend on a fixed support beside the cam 234 and having its upper arm connected to a spring 222$^a$, which normally tends to hold the locking-arm of the stop-lever out of position to engage with pin 234$^b$. The lever 222 is locked in position to engage pin 234$^b$ by means of a dog 223 on a rock-shaft 224, which extends toward the right of the machine and is connected to one of the key-controlled actuating-bars 182 by means of a crank-arm 225, rod 225$^a$, bell-crank 184, and other connections similar to those of other type-character-ejecting devices of the machine. Upon the depression of the "space-key" the proper bar 182 is depressed and actuated by a rib on cylinder 169, thereby through its connections rocking shaft 224 and disengaging dog 223 from stop-lever 222, whereupon the spring 222$^a$ swings the latter on its pivot, causing it to disengage pin 234$^b$, whereupon the cam-plate is revolved by the friction-disks 233 235 (which run continuously) and caused to make one revolution, and in so doing the swell of the cam 234 engages arm 238 and rocks shaft 236$^a$, causing arm 236 to actuate ejector 242, which forces the lowermost space S in channel 241$^a$ out into channel $d$, by which it is directed to the assembling-point. Almost immediately after cam 234 begins to rotate its pin 234$^b$ engages the other curved arm of stop-lever 222 and rocks said lever on its pivot, swinging its lower arm back into position to again engage pin 234$^b$, and the stop-lever 222 is again locked in such position by dog 234 until it is again released upon the depression of the space-key. Therefore when cam 234 has made one revolution it is locked by pin 234$^b$ and lever 222.

A spring 223$^a$ may be used to assist in throwing the dog 223 back in position to lock lever 222. By this means one space will be delivered each time the space-key is depressed.

By shifting pin 234$^b$ into different holes 234$^a$ in the cam 234 the time when (during the rotation of the cam) the ejector will be actuated can be varied—that is, pin 234$^b$ can be arranged so that the cam will cause the ejection of a space more or less quickly after the cam is started, as may be desired.

When compressible spaces are used, it is purposed to furnish these in quantities from the foundry and to only use them once, and therefore it is desirable to have convenient means, such as described, whereby galleys or reservoirs of such spaces can be conveniently connected to the machine and used therein.

For convenience of the operator a switch 126 is attached to the side of channel D, by which one or more characters or spaces can be delivered into the hand of the operator instead of to the assembling-point, as the operator may need same in correcting a line.

*Line and space indicator.*—In machines wherein justification is effected by lineal compression of the line it is desirable to provide means whereby the operator may accurately determine at a glance when sufficient type have been set to make a line and whether such line is compressible or not. In my Patent No. 601,498, of March 20, 1898, are shown devices of such a character, and in the present machine I employ an improved indicating mechanism as follows:

To the front of the machine is attached the indicating mechanism I, in which are two sliding bars 506 and 507, which are provided with dovetailed ribs, which engage dovetailed guide-grooves on the top and bottom plates 504 503 of the indicator-casing. (See Figs. 17, 18, and 19.)

The bar 506 is provided with a rack which engages a large gear 511, connected to the hub of a smaller pinion 510, journaled upon a pin 512, fast to the top plate 504. Pinion 510 meshes with a sliding rack-bar 505, which is provided with a dovetailed rib, by which it is supported in a dovetailed guide-groove on the top plate 504, as shown, and rack-bar 505 is connected by rod 505$^a$ to the sliding bar 486, which is supported on casting 1 just above and in line with the assembling channel or slot E$^2$ of the machine. As before stated, this bar 486 is provided with an adjustable tappet 520, which is adapted to be engaged by the end of the follower 7 which is being pushed out of the packer-cylinder 2 by the line of type being assembled. Consequently as the type are assembled in the channel the bar 486 will be pushed farther and farther to the left and through the rack-bar 505, and pinions 510 and 511 will actuate slide 506, the end of which is visible to the operator, and by the position thereof he can determine at a glance when sufficient type have been assembled to form a line. Each time the packer-cylinder is shifted the bar 506, rack-bar 505, and slide 486 may be returned to zero position (ready to begin the indication of a new line) by springs or other suitable means. As shown, a clock-spring 511$^a$ is connected at one end to the hub of gear 511 and at the other end to a stationary support, and said spring will be tensioned as the line-indicator is moved outward and will automatically return the parts to normal or zero position as soon as the line is moved out of the way and a new channel brought into register with the setter.

The space-indicator bar 507 is provided with a ratchet 507$^a$ on its inner edge, which is adapted to be engaged by a pawl-escapement mechanism comprising a dog 508, which is pivoted on a pin 556 beside bar 507 and an opposite dog 509. Each time dog 508 is pulled out of engagement with the rack-bar 507 dog 509 is thrown into engagement therewith. This dog 509 is pivoted upon the same pin as dog 508, but projects in the opposite direction and is pushed inward when dog 508 is thrown outward by means of a spring 508$^c$, attached to dog 508. When dog 508 moves inward to engage the rack, its tail strikes a pin 509$^a$ on dog 509 and moves the latter outward.

Dog 508 is pushed inward by a stiff spring 508$^d$, as shown. I thus obtain a step-by-step escapement movement for the bar 507.

Dog 508 is connected by a rod 508$^a$ to a crank-arm 224$^c$ on rock-shaft 224, so that each time a space is fed the dog 508 will be caused to disengage ratchet 507$^a$, and slide 507 will be moved downward by means of arm 496, which is connected to a rock-shaft 496$^a$, which is impelled in one direction by a spring 496$^b$ thereon. The shaft 496$^a$ extends forward under the bar 78 and is provided on its outer end with a short crank-arm 494, which is in position to be engaged by a pivoted trip 493, mounted on the slide 79, which trip will pass freely over arm 494, while the slide 79 moves the line-transferrer 81 to the right; but when the slide moves to the left dog 493 engages arm 494 and rock-shaft 496$^a$ and through arm 496 moves the space-indicating bar 507 back to normal position.

The space and line indicating bars are arranged side by side in casing I and are so formed and moved relatively to each other that the operator can determine at a glance from the relative position of these two bars the number of spaces in the line and whether or not the line can be justified by compression, and the operator can readily tell by the position of the line-indicator 506 whether the line will permit the addition of another syllable or word.

*The galley-loader and type-leading mechanism.*—As above explained, the line of type is taken from the holder 32 by a transferrer 81 to a galley. This galley is located at the right-hand end of the machine, and the galley G is supported upon a suitable bracket 42, having end bars 44 and 46, adapted to receive an ordinary brass galley G, which can be retained in position by a spring-actuated catch or presser 49. (See Fig. 16.) The upper bar 46 of the galley-support is directly in line with the type-channel 30$^b$, and the line of type is moved out of channel 30$^b$ by transferrer 81 over bar 46 and between a laterally-movable plunger 56 and a vertically-movable rule 59, the space between the rule and plunger (when the plunger is retracted and the rule elevated) forming a continuation of the channel 30$^b$. Rule 59 is attached to a sliding head 50, provided with a dovetailed rib 60, engaging a suitable groove in the supporting-bracket 41, and the head 50 is provided with a rack 51, which engages a rocking segment 52, that is pivoted at its rear end on the bracket 42 and is operated by a push-bar 35, provided with a friction-roller engaging a race-cam 21$^a$ in the cam 21, fixed to the shaft 216. The head 50 is also connected by side rods 57 to a cross-bar 58, which lies above the bar 46 and above the lower end of a lead-box 203, which is supported upon a bracket-casting 204, which lies above, but in line with, the galley G. To the head 58 is attached a plate 58$^a$, which lies above and in line with the rule 59 and is adapted to depress one or more of the leads L into the galley and between the line lying against the plunger 56 and the previously-composed matter, the lead slipping down in front of the type as the rule 59 descends. The leads are fed forward in the lead-box 203 by means of a follower 208, to which is attached a bolt 211, that depends through a slot in the bottom of the box and is connected to one end of a cord 178$^a$, which is passed around a pulley 487, attached to the bracket beneath the lead-box, and is then carried backward to and over a pulley 178 and connected to the weight 178$^b$, as shown, which tends to press the follower forward in the lead-box. The lead-box 203 is preferably removable, being held in place on bracket 204 by means of catches 203$^a$ engaging pins 203$^b$ on the box. The front end of box 203 is closed by a plate 209, against which the leads are pressed, when the lead-box is in place, and a top plate 210 is attached to the lower end of the box to prevent the leads being pulled upward when the plate 58 rises.

The plunger 56 is attached to a slide 55, which is properly guided in the casting 41 and is provided with a rack 55$^a$, that meshes with a segment 53, which is pivoted on the bracket and actuated by means of a sliding rack-bar 38, suitably guided in the casting 41 or other fixed support. Rack-bar 38 has a roller 38$^a$ on its lower end, which runs upon the periphery of cam 21, as shown, and the rack-bar 38 is depressed by means of a spring 38$^b$, set in a recess of the bar and interposed between the lower end thereof and the fixed plate 205, attached to the bracket 41 or other suitable stationary support, spring 38$^b$ being preferably strung upon a guide-rod, as shown.

Cams 21$^a$ and 21 operate the rule 59 and plunger 56, respectively, and are so timed that the rule will be lowered before the plunger 56 is operated, and the plunger will be withdrawn before the rule rises. The plunger is retracted and the rule raised before the line of type is brought forward to the galley by the transferrer 81.

When the transferrer 81 has brought a line of type into position between the plunger and rule, it remains stationary while the rule is lowered, and as the rule is lowered the lead is dropped down in front of the line by the pusher-plate 58$^a$. When the rule is completely lowered, its upper end is just flush with the top of bar 46 and then forms part of the bottom of the galley-head. The plunger 56 is then actuated, so as to move the line of type across the rule and down in the galley. It will be observed that the plunger 56 is longitudinally grooved at 56$^c$, and this is to enable the line-transferrer 81 to be moved back toward the line-holder without having to wait for the retraction of the plunger 56. As soon as the plunger has moved sufficiently downward to allow the groove 56$^c$ to register with the slot 30$^b$ the transferrer 81 is moved back to the left into position to receive the next line from the justified-line holder 32, and the plunger 56 and rule 59 will be returned to their normal positions ready to receive a fresh line of type before the transferrer again brings a line to the galley.

I have now described the complete machine, and it will be seen that mechanism for performing every operation necessary in composing type, justifying the lines, leading the lines, and placing the same in the galley is provided and that all these operations are performed automatically.

While the operation of the several mechanisms has been clearly explained in connection with the detailed description thereof, I will briefly recapitulate as follows:

The operation of the machine is practically continuous, no time being necessarily lost for justification of the lines, for while one line is being justified a new line may be in process of composition. The types are ejected from the reservoir 424 sidewise, as shown in Fig. 22, by means of the ejector-levers 193, operated from a key by means of the described connections. The ejected type drops face outward into the slots A' of rings 100; but as it passes therethrough its face end is arrested by the pin, while its foot continues to move, and the type swings upon the pin and is turned end for end in the slot and then slides out upon the rotating carrier 101 feet first in the direction of its travel, the type traveling feet first to the assembling-point. At the point where the types leave the carrier-disks to enter the composing-channel the coaxer-wheel 587 is provided to prevent retardation of the type at such point. The type are forwarded by the packer 124 into one of the receiving-channels $2^a$ of the packer-cylinder 2, and as they enter such channels they eject the follower 7 therefrom, and as the follower is moved outward it actuates the slide-bar 486, by which the alarm and visual line-indicator are operated. The spaces are fed from a separate reservoir directly to the packer, so as to be assembled with the type, as already described, and each time a space is fed the space-indicator bar, beside the line-indicator bar, is actuated, so that the operator can always determine by these indicators both the extent of the line being composed and the number of spaces therein. As soon as sufficient type to constitute a line have been composed in one channel $2^a$ the operator by depressing lever 196 throws the worm-clutch gear drive for shaft 216 into operation, and one rotation is given to said shaft. As soon as shaft 216 commences to rotate the rotary packer 124 is moved back, so as not to interfere with the rotation of the packing-cylinder, and locking-bolt 12 is disengaged from the packer-cylinder by means of the cam 19 and bar 34 and connections. Next the packer-cylinder is partially rotated by means of the cam 23 and bar 33, so as to move the composed line out of the way and bring an empty channel into register with the channel D. Then the packer-cylinder is locked by the bolt 12 and the packer 124 simultaneously moved back into position to forward the lines into the next empty channel $2^a$ of the packer-cylinder. This partial movement of the packer-cylinder, however, moves a previously-composed line of type into register with the channel in the justified-line holder 32, and as soon as the packing-cylinder is again locked the justifier-head 11 is actuated by cam 22 and lever 37 and forces follower 7 to eject such line of type out of the channel of the packer-cylinder into the holder 32, where it is justified by means of the packer-head 11 and the justifying-wedge 27, operated by the yoke 26 and pin $24^a$, the justifying-head operating upon the type through the medium of the follower 7 in the type-channel $2^a$ and the wedge acting through both the head 11 and follower, justifying the line by lineal compression to the exact length of the channel in holder 32. Previous to the justification of the line and as it is being pushed into the holder 32 the line-planer 461 is lowered into position to engage the line of type and smooth it down, so that the type will all be on their feet. The wedge is then lowered and the justifier retracted, and in doing so it engages a catch-bar 8, which is arranged to partially retract the follower 7 and prevent its locking the packing-cylinder to the casing or holder, as above described. As soon as the line is properly justified by compression, which will be as soon as it has fully entered into the holder 32, the line-planer 461 is raised and the holder 32 is rocked, so as to move the justified line into position to be engaged by the line-transferrer 81, which is operated by sliding bar 79 and augmenting racks and gears from the lever 37, which actuates the justifier-head, so that as the justifier-head is moved backward the line-transferrer is caused to move the justified line of type over into position at the head of the galley, the transferrer stopping with the justified line in position between a vertically-movable rule 59 and a horizontally-movable plunger 56. Then while the transferrer is momentarily stopped the rule 59 is lowered and (if it is desired to lead the matter) a lead is slipped down by a plate $58^a$ from the lead-box 203 between the line of type and the previously-composed matter in the galley, and when the rule has completely descended the plunger 56 moves forward and pushes the line down in the galley. The plunger is slotted, so that the transferrer can be moved back into position to take another line from the justifying-holder 32 before the plunger 56 is retracted. The justifier-head is returned to its normal retracted position just as the shaft 216, which is the prime actuating-shaft, has completed one revolution, and when it has done so the worm-clutch is automatically thrown out of gear, as described, so that shaft 216 only makes one rotation each time the lever 196 is depressed.

From the foregoing description it will be observed that the machine embodies many of the principles and some of the mechanisms, broadly speaking, which have been heretofore patented to me applied to a type-setting machine having a cylindrical reservoir and rotating disk type-carrier; but the machine embodies many important improvements over my previous patents, and therefore

What I claim as new, and desire to secure by Letters Patent, is—

1. The combination of the type-holding channel, means for ejecting type laterally therefrom, a type-guide slot beside the channel into which the ejected type are delivered having a curved rear wall extending from the rear to the front of the slot, and a type-arresting device or pin at the outer side of said slot and below the channel whereby the face end of the type is arrested in the passage of the type through the slot until the type has turned end for end, substantially as and for the purpose described.

2. The combination of the type-channel in which the type are placed face outermost, the carrier below the channel, a guide-slot for directing the type from the channel onto the carrier, said slot being disposed to one side of the channel and having a curved rear wall, and a pin or arresting device at its outer side, and means for ejecting a type laterally from the channel into said slot, whereby the type is turned end for end in dropping through the slot so that it will be delivered feet first onto the carrier.

3. The combination of the type-carrier, a type-holding channel above the same in which the type are arranged face outermost or toward the carrier, a type-guide slot for conducting the type from the channel onto the carrier, said guide-slot being arranged in line with, but to one side of, the type-channel and adapted to receive the type ejected laterally therefrom, said slot having a downwardly and outwardly curved rear wall and being widened at its lower end, and a pin across the outer edge of said slot just below the channel, whereby the type ejected laterally face outermost, from the channel into the slot, are turned end for end in dropping therethrough and delivered feet foremost onto the carrier.

4. The combination of the cylindrical reservoir having a series of type-holding channels, means for ejecting type laterally therefrom, a casting below the reservoir having a series of type-guide slots beside the channels into which the ejected type are delivered, a rotary type-carrier below the casting, and type-arresting devices or pins at the outer sides of said slots whereby the outer or face end of the type is arrested in the passage of the type through the slot until the type has turned end for end, substantially as and for the purpose set forth.

5. The combination of the cylindrical reservoir having a series of type-channels in which the type are placed face outermost, the rotary carrier below the channel, a casting having a series of guide-slots for directing the type from the channels onto the carrier, said casting being arranged between the carrier and reservoir and having its slots disposed to one side of the channels, said slots having curved rear walls, and pins or arresting devices at the outer sides of said slots, and means for ejecting type laterally from the channels into said slots, whereby the type are turned end for end in dropping through the slots so that they will be delivered feet first onto the carrier.

6. The combination of the vertical type-holding channel in which the type are arranged face outermost, the type-guiding slot to one side of and below the type-channel, said slot having a downwardly and outwardly curved rear wall, and a pin across the outer face of the slot just below the channel, said pin and the curved rear wall of the slot serving to turn the type end for end as it passes through the slot, a carrier below the slot, and a pivoted pusher for ejecting a type laterally from the channel into the slots.

7. The combination of the type-reservoir having vertical type-holding channels in which the type are arranged face outermost, a casting below the reservoir having type-guiding slots disposed to one side of and below the type-channels, each of said slots having a downwardly and outwardly curved rear wall, and pins across the outer face of the slot just below the channel, said pins and the curved rear walls of the slots serving to turn the type end for end as they pass through the slot, a rotary carrier below the slotted casting, and a series of pushers pivotally supported on the casting and adapted to eject the type laterally from the channels into the slots, substantially as described.

8. The combination of the type-channel, a guide-slot to one side of and below the channel, the pivoted pusher 193 adapted to eject the type laterally from said channel into said slot, the bell-crank lever for operating said pusher, and connections for operating said bell-crank lever from the keyboard.

9. The combination of the type-channel, a guide-slot to one side of and below the channel having a curved rear wall extending from the rear to the front thereof, the pivoted pusher adapted to eject the type laterally from said channel, the carrier below said slot, and a pin across said slot at the front side thereof whereby the type are turned end for end in passing through the slot from the channel to the carrier.

10. The combination of the reservoir having a series of type-channels, a casting below the reservoir having a series of guide-slots in its periphery, said slots being disposed to one side of the channels and having curved rear walls extending from the rear to the front thereof; the pivoted pusher adapted to eject the type laterally from said channel, and levers and connections for operating said pushers from the keyboard, the carrier below said slotted casting, and pins across said slots near the front sides thereof whereby the types are turned end for end in passing through the slots from the channel to the carrier.

11. The combination of the type-reservoir, the casting 100 having type-guide slots A' disposed to one side of the channels of the reservoir, and means for ejecting the type laterally from said channels into said slots; with the rotatable carrier 101 having an annular gear 103 and the annular casting 102 attached to casting 100 and by which the carrier and its gear are supported.

12. The combination of the type-reservoir, the casting 100 below the same having guide-slots A', the horizontally-movable type-pushers pivoted on casting 100 and adapted to eject type laterally from the type-channels into the guide-slots A', slots A' having curved rear walls extending from rear to front thereof and pins across the front ends of the slots adapted to turn the type end for end as they pass therethrough, the bell-crank levers for operating said pushers, a slotted plate on which the crank-levers are pivoted, and means for operating said crank-levers from the keyboard, substantially as described.

13. The combination of the type-reservoir, the casting 100 below the same having type-guide slots A' in its periphery disposed to one side of the channels in the reservoir, the horizontally-movable type-pushers pivoted on casting 100 and adapted to eject type from the type-channels in the reservoir laterally into said slots, the bell-crank levers for operating said pushers, and means for operating said bell-crank levers from the keyboard with the annular carrier 101 provided with an annular gear 103 and the plate 102 attached to casting 100 on which the carrier is supported.

14. The combination of the type-reservoir, the casting 100 below the same, the horizontally-movable type-pushers pivoted on casting 100 and adapted to eject type laterally from the type-channels in the reservoir into guide-slots A' in the periphery of casting 100, slots A' being adapted to turn the type end for end as they pass therethrough, the bell-crank levers for operating said pushers, a slotted plate suspended from casting 100 on which the crank-levers are pivoted, and means for operating said bell-crank levers from the keyboard, with the annular carrier 101 below the slots A' provided with an annular gear 103 and the plate 102 attached to casting 100 on which the carrier is supported.

15. The combination of the setter having a shaft mounted in a rocking bearing, the casting suspended from the setter-shaft, the vertical shaft having its upper end journaled in said casting and its lower end journaled in a rocking bracket, gearing between said shafts, means for rotating said vertical shaft, and means for rocking said bearings, for the purpose and substantially as described.

16. The combination of the packing-cylinder, the bolt for locking the same, the movable bar, a spring-pressed lever on said bar engaging and supporting said bolt, substantially as described.

17. The combination of the packing-cylinder, the bolt for locking the same, the movable bar, a pivoted bell-crank lever on said bar having its short arm engaging said bolt and its long arm pressed outward by a spring, for the purpose and substantially as described.

18. The combination of the packing-cylinder, the vertically-movable cam-actuated bar, the bell-crank lever pivoted thereon having its longer arm pressed outward by a spring against a stop projection on said bar, and the bolt supported upon the short arm of said bell-crank lever, substantially as described.

19. The combination of the packing-cylinder, the vertically-movable cam-actuated bar 34, the bell-crank lever 16 pivoted thereon having its longer arm pressed outward by a spring against a stop projection on said bar, and the bolt mounted in an adjustable guide attached to the cylinder-casing and supported upon the short arm of said bell-crank lever, substantially as described.

20. The combination of the packing-cylinder, the movable bar, the spring-pressed lever pivoted thereon, and the bolt supported upon said lever, in combination with a setter for pushing type into the channels of the packing-cylinder, an eccentric journal for said setter-shaft, and connections between said setter and the bolt-actuating bar, whereby the setter is rocked away from the packer when the bolt is released, and is rocked toward the packer when the bolt is engaged therewith.

21. The combination of the packing-cylinder, the vertically-movable cam-actuated bar, the bell-crank lever pivoted thereon having its longer arm pressed outward, by a spring, against a stop projection on said bar, and the bolt supported upon the short arm of said bell-crank lever; in combination with a setter for pushing type into channels of the packing-cylinder, eccentric journals for said setter, and connections between said setter and the bolt-actuating bar whereby the setter is rocked away from the packer when the bolt is released, and is rocked toward the packer when the bolt is engaged therewith.

22. The combination of the channeled packer-cylinder, the followers therein, and the justifier-head for pushing said followers inward to eject a line of type from the packer-cylinder; with a movable retractor-bar lying above the justifier-head and having a hook on its inner end adapted to engage the outer end of the follower when the same has been pushed fully inward and to retract the latter when the justifier-head is moved back, said bar being actuated in one direction by the justifier-head and in the other direction by the bar, substantially as described.

23. The combination of the packer-cylinder 2, having a series of channels $2^a$, the followers 7 in said channels, and the sliding justifier-head adapted to push said levers inward to eject a line of type from the packer-cylinder into a receiver; with a sliding retractor-bar 8 mounted in stationary guides and lying above the justifier-head and having a hook on its inner end adapted to engage a hook or notch on the outer end of a follower 7 when the latter has been pushed fully inward by the head, and to retract the follower from the receiver when the justifier-head is moved back, substantially as described.

24. The combination of the justifying-wedge and the yoke and cam for actuating said wedge; with a wedge-cushioning device comprising a pivoted lever adapted to be engaged by a pin on the wedge when the latter is elevated, and a cam whereby said bar is gradually lowered, thus cushioning the descent of the wedge.

25. The combination of the justifying-head, the wedge for operating the same, the yoke and cam for projecting said wedge, and a spring for retracting it; with a wedge-cushioning device comprising a lever pivoted beside the wedge and adapted to be engaged by a pin on the wedge when the latter is projected, and a cam-surface on the wedge-actuating cam whereby said bar is gradually lowered, thus slowing the descent of the wedge.

26. The combination of the justifying-wedge, the supporting-yoke 26 having the flange 26ª, the gear 24, the cam-disk having a pin 24ª adapted to engage said flange 26ª and operate the wedge, and the spring for depressing said wedge, for the purpose and substantially as described.

27. The combination of the wedge, the supporting-yoke 26 having the flange 26ª, the gear 24, the cam or wheel having a pin 24ª adapted to engage said flange 26ª and operate the wedge, and the spring for depressing said wedge; with a pivoted lever, the cam 22ª for raising and lowering said lever, and the pin 27ª on the wedge adapted to engage said lever whereby too-rapid descent of the wedge is prevented, for the purpose and substantially as described.

28. The combination of a shaft, a worm gear-wheel thereon, a continuously-driven worm mounted in a swinging bracket, a rock-shaft and links whereby said worm may be raised into engagement with said gear, a swinging latch adapted to engage a pin on the link when the worm is elevated so as to lock the worm in engagement with the gear, and a device on said gear adapted to force the latch out of engagement with the pin, thereby allowing the worm to drop and the worm-gear to cease rotating, substantially as described.

29. The combination of the shaft, the worm-gear thereon, the continuously-driven worm mounted in a swinging bracket, the rock-shaft and links whereby said worm may be raised into engagement with the worm-gear, a swinging latch adapted to engage a pin on the link when the worm is elevated so as to lock the worm in engagement with the gear, and an adjustable unlocking plate on said gear adapted to engage the lower end of said latch and force the same out of engagement with the pin, thereby allowing the worm to drop and the worm-gear to cease rotating, substantially as described.

30. The combination of the continuously-driven worm mounted in a swinging support, a link connected to said support, and means for causing said link to throw the worm upwardly; with a worm-gear above the worm adapted to be driven thereby when the worm is thrown upward, a swinging latch pivoted beside the worm-gear and link, and adapted to engage the link when the worm is thrown upward and thereby lock said shaft in engagement with the gear, and a device on the worm-gear adapted to engage the latch, when the worm-gear has made one revolution, and cause it to release the link thereby permitting the worm to be thrown out of engagement with the gear, substantially as described.

31. The combination of the continuously-driven worm mounted in swinging bearings, a link connecting said bearings to an arm on a rock-shaft, and a lever and connections for rocking said shaft so as to throw the worm upwardly; with a worm-gear above the worm adapted to be driven thereby when the worm is thrown upward, a swinging latch pivoted beside the worm-gear and link, and having a catch adapted to engage a lateral pin on the link when the worm is thrown upward and thereby lock said shaft in engagement with the gear, and an adjustable plate on the worm-gear provided with a pin or roller adapted to engage the lower end of the catch, when the worm-gear has made one revolution, and force the latch outward, substantially as and for the purpose described.

32. The combination of a channel in which the line of type is composed, a line-holder to one side of the composing-channel into which the composed lines of type are ejected, and means for ejecting the line of type from the channel into the holder and compressing the same in the holder lineally, thereby justifying the same, and means for removing the justified line from the holder, substantially as described.

33. The combination of a movable channel in which the line of type is composed, a line-holder to one side of the composing-channel into which the composed lines of type are ejected, a follower in said channel and means for actuating said follower so as to eject the lines of type therefrom into the holder, and compressing the same in the holder lineally, thereby justifying the same, and means for removing the justified line from the holder, substantially as described.

34. The combination of a channel in which the line of type is composed, a line-holder into which the composed lines of type are ejected, means for ejecting the lines of type from the channel into the holder and compress the line lineally, thereby justifying the line; with a type-receiving channel and means for moving the holder after a line is justified into position so that the justified line of type therein can be moved into said receiving-channel.

35. The combination of a movable channel in which the line of type is composed, a line-holder to one side of the composing-channel into which the composed lines of type are ejected, a follower in said channel, and means for actuating said follower so as to eject the lines of type therefrom into the holder and compress the same in the holder lineally, thereby justifying the line; with a type-channel leading to the galley-head and means for moving the holder after a line is justified into position so that the line of type therein can be moved into the channel leading to the galley.

36. The combination of the packer-cylinder, a movable justified-line holder beside the said cylinder into which the lines are ejected from said cylinder, and a type-receiving channel at one side of the line-holder, and means for ejecting a line of type from the holder into said channel, and means for moving said line-holder alternately into position to receive a line from the packer and to surrender the line to the receiving-channel.

37. The combination of the packer-cylinder, a vibrating justified-line holder beside the packer-cylinder, means for ejecting a line of type from the packer-cylinder into the holder and justifying the line therein by lineal compression; and a type-receiving channel at one side of the line-holder; with means for ejecting a type from the line-holder into said channel, and means for moving said line-holder alternately into position to receive a line from the packer and to surrender the line to the receiving-channel.

38. The combination of the rotary packer-cylinder having a peripheral series of channels in which the type-lines are successively composed, the followers in said channels, and means for causing said followers to eject a composed line of type from the packer-cylinder; with a justified-line holder at one end of the packer-cylinder, into which the composed lines of type are successively discharged from said cylinder, and means for removing the said line from the holder after justification thereof for the purpose and substantially as described.

39. The combination of the rotary packer-cylinder having a peripheral series of channels in which type-lines are successively composed, the followers in said channels, and means for actuating said followers so as to successively eject the composed lines of type from the packer-cylinder; with a justified-line holder at one end of the packer-cylinder into which the composed lines of type are successively discharged from the packer-cylinder by said followers and justified by lineal compression therein, a line-receiving channel beside the holder, and means for moving said holder so as to alternately receive a line from the packer-cylinder and to deliver the line to the receiving-channel and means for ejecting the line from the holder into said receiving-channel, substantially as described.

40. The combination of the justified-line holder having a line-receiving channel, a channel or slot at one side of the holder through which composed lines of type can be introduced into the holder, and the channel at the other end of the holder into which the justified lines can be removed, and means for moving the holder so as to alternately register it with the said slot and said channel; with means for composing a line of type and forcibly ejecting the same lineally into the said holder through said slot and compressing the same therein, and means for removing the justified line from said holder when it has moved into position to register with the receiving-channel.

41. The combination of the justified-line holder, and means for moving the holder so as to alternately register it with the receiving and delivery devices; with the sliding follower in said line-holder adapted to be forced out of the line-holder when the line is justified therein, the spring-actuated bar for controlling said follower, and means for holding said follower after a line has been ejected into the holder until the holder has delivered the line to the receiving-channel or transferring device and returned to normal position.

42. The combination of the justified-line holder having a line-receiving channel, a channel or slot at one side of the holder through which composed lines of type can be introduced into the holder, and the channel at the other end of the holder from which the justified lines can be removed, and means for moving the holder so as to alternately register it with the said slot and said channel; with the sliding follower in said holder adapted to be forced out of the line-holder when the line is justified therein, the spring-actuated bar for controlling said follower, and means for holding said follower after a line has been ejected into the holder and until the holder has delivered a line to the receiving-channel or transferring device and returned to normal position.

43. The combination of a composing-channel in which a type-line is composed, a follower in said channel and means for actuating said follower so as to eject the composed lines of type from the channel; with a laterally-movable justified-line holder into which the composed line of type is discharged when the holder is in one position, and means for justifying the line in the holder; with a galley, and a line-transferring device adapted to take the justified line from the holder when it is in another position and deliver the same to the galley, substantially as described.

44. The combination of the channel in which the type-lines are successively composed, and means for ejecting the composed lines of type from the channel; with a justified-line holder into which the composed lines of type are successively discharged; means for justifying the line in said holder, a channel leading to a galley, and means for moving said holder so as to alternately receive a line from the composing-channel and to deliver the line to a receiving-channel; with a galley, and the line-transferring device adapted to take the line from the holder and deliver the same to the galley, substantially as described.

45. The combination of the rotary packer-cylinder having a peripheral series of channels in which the type-lines are successively composed, the followers in said channels, and means for actuating said followers so as to eject the composed lines of type from the packer-cylinder; with a justified-line holder at one end of the packer-cylinder, into which the composed lines of type are successively discharged from the packer-cylinder; and means for moving said holder so as to alternately receive a line from the packer-cylinder and to deliver the line to a receiving-channel; with a galley, and the line-transferring device adapted to take the line from the holder and deliver the same to the galley, substantially as described.

46. The combination of the rotary packer-cylinder having a series of type-receiving channels and the followers in said channels, and mechanism substantially as described for causing said followers to forcibly eject the composed lines of type from said cylinder at the proper time when the channels therein register with the exit-slot in the cylinder-casing; with a justified-line holder having a type-receiving channel adapted to register with said exit-slot, a spring-actuated follower in said line-holder adapted to be ejected therefrom by the incoming line of type; with a type-receiving channel at the opposite end of the holder; means for moving said holder laterally so as to move the justified line into register with the type-receiving channel and means for moving the line from the holder into said receiving-channel, substantially as described.

47. The combination of the packer-cylinder having a series of type-receiving channels and the followers in said channels, and means for causing said followers to forcibly eject the composed lines of type from said cylinder; with a justified-line holder having a type-receiving channel adapted to receive the line from said packer-cylinder, and means for moving said holder laterally so as to move the justified line into register with a type-receiving channel, a galley at the end of said receiving-channel, and a line-transferrer adapted to take the line from the holder and move it through said channel into the galley.

48. The combination of the packer-cylinder having a series of type-receiving channels and the followers in said channels, and a sliding head for causing said followers to forcibly eject the composed lines of type from said cylinder at the proper time; with a justified-line holder having a type-receiving channel adapted to receive the lines from the packer-cylinder, and means for moving said holder laterally so as to move the justified line into register with a type-receiving channel, a galley at the end of the receiving-channel and a line-transferrer adapted to take the line from the holder and move it through said channel into the galley, said line-transferrer being actuated immediately from the sliding head by which the followers are caused to eject the lines of type from the packer-cylinder.

49. In a type-setting machine, the combination of a channel in which the line of type is composed, a follower in said channel, a sliding justifier-head for operating said follower so as to cause it to eject the composed line from the channel; a laterally-movable line-holder having a type-receiving channel adapted to receive the composed line, a galley at the end of said holder opposite the packer-cylinder, a channel leading into said galley, and a movable transferring device adapted to move the line from the holder into the galley when the channel in the holder is registering with the channel leading to the galley, and means whereby the holder is moved so as to alternately register with the composing-channel and with the galley-channel, substantially as described.

50. In a type-setting machine, the combination of means for composing type, a rotary packer-cylinder having a series of channels into which the lines of type are successively composed, a follower in each channel, a sliding justifier-head for operating said followers so as to cause them to successively eject the composed lines from the packer-cylinder when the channels register with the holder, and means for moving the packer-cylinder so as to successively bring the channels therein into register with the type-feed channel and with the holder; with a laterally-movable line-holder at one end of the packer-cylinder having a type-receiving channel adapted to receive the composed lines, a galley at the end of said holder opposite the packer-cylinder, a channel leading into said galley, and a movable transferring device adapted to move the line from the holder into the galley when the channel in the holder is registering with the channel leading to the galley, said line-transferrer being actuated indirectly from the mechanism which operates the justifier-head, and means whereby the holder is moved so as to alternately register with a packer-cylinder channel and with the galley-channel, substantially as described.

51. The combination of the laterally-movable line-holder, the sliding block supporting the same, the rock-shaft, the segment thereon engaging a rack on said block for operating said holder, and the cam connections for rocking said shaft, substantially as described.

52. The combination with the sliding plate, the line-holder removably attached thereto, the rock-shaft, the segment thereon engaging a rack on said block for operating said holder, means for rocking said shaft, and a spring-actuated follower adapted to operate in said holder.

53. The combination of the type-composing mechanism, the line-holder beside said mechanism into which the composed lines of type are successively ejected and justified by lineal compression, said holder being removable and interchangeable to accommodate lines of different lengths.

54. The combination of the type-composing mechanism, the line-holder beside said mechanism into which the composed lines of type are successively ejected and justified by lineal compression, a line-transferring mechanism at one side of said holder, and means for shifting said holder alternately into position to receive a line from the composing mechanism and to deliver a line to the transferring mechanism, said holder being removable and interchangeable to accommodate lines of different lengths.

55. The combination of the composing mechanism and means for ejecting composed lines therefrom, a type-receiving channel, and transferring mechanism for moving lines of type therein; with a type-line holder interposed between said channel and said composing mechanism, and means for moving said holder alternately into position to receive a line from the composing mechanism and into position to deliver the same to the transferring mechanism.

56. The combination of the composing mechanism and means for ejecting composed lines therefrom, a type-receiving channel, and a transferring mechanism for moving lines of type therein; with a removable and interchangeable type-line holder interposed between said channels and said composing mechanism and means for moving said holder alternately into position to receive a line from the composing mechanism and into position to deliver the same to the transferring mechanism, and means for compensating said channel to suit different-sized holders, substantially as described.

57. The combination of the composing mechanism and means for ejecting composed lines therefrom, a type-receiving channel, and means for moving lines of type therein; with a type-line holder interposed between said channels and said composing mechanism, said holder being removable and replaceable by a like holder of different length, and a removable and replaceable casting whereby the length of the type-receiving channel may be varied to suit the length of the line-holder casting.

58. The combination of the composing mechanism and means for ejecting composed lines therefrom, a type-receiving channel, and means for moving lines of type therein; with a type-line holder interposed between said channels and said composing mechanism, and means for moving said holder alternately into position to receive a line from the composing mechanism and into position to deliver the same to the transferring mechanism, said holder consisting of a movable plate upon which is supported a removable channeled casting, said casting being removable and replaceable by a like casting of different length; and a removable and replaceable channeled casting whereby the length of the type-receiving channel may be changed to suit the changed length of the line-holder.

59. The combination of the slide and rock-shaft and connections for operating said slide, a line-holder removably attached to said slide and interchangeable with like holders of different lengths, a type-channel into which the lines are ejected from the holder, and the removable block having a channel forming a continuation of the type-receiving channel and interchangeable with like blocks of different lengths whereby the holder can be adapted to receive different lengths of lines and the receiving-channel lengthened or shortened to suit the length of the line-holder.

60. The combination of a line-holder, a galley, a channel leading from the line-holder to the galley, and a line-transferrer adapted to traverse said channel and to move a line from the holder through a channel into the galley, said transferrer comprising an adjustable bar 81 adapted to straddle a line of type, and operated by means of a toothed slide mounted on a fixed guide, said slide being operated by amplifying gearing from a sliding rack-bar, substantially as described.

61. The combination of the composing-channel, a line-holder, a movable plunger for ejecting a line of type from the composing-channel into the holder, a slide for actuating said plunger, and a cam-actuated lever for operating said slide; with a galley, a channel leading from a point beside said holder to the galley, a line-transferrer operating in said channel adapted to move the line into the galley when the holder registers with the channel, a slide for operating said transferrer, a rack attached to said slide, a pinion meshing with said rack having a smaller pinion on its hub, a sliding rack meshing with said smaller pinion, and connections between said sliding rack and the said cam-actuated lever, for the purpose and substantially as described.

62. The combination of the packing-cylinder having a series of channels each adapted to receive a line-type as it is composed, a follower in each channel, a sliding head for causing said plungers to eject the type from the packer-cylinder, a cam-actuated lever for operating said head, a laterally-movable type-line holder into which the composed lines are ejected from the packing-cylinder, a channel at the end of said holder beside the packing-cylinder leading to a galley, a reciprocating line-transferrer moving in said channel, and a slide-bar for operating said line-transferrer, a pinion engaging said bar, a small pinion on the shaft of the large pinion engaging a reciprocating rack, and connections between said reciprocating rack and the actuating-lever for said head, and means for moving the line-holder from a position to receive the line from the packing-cylinder into position to deliver the same to the line-transferrer, all substantially as described.

63. The combination of a line-holder into which the type are moved and justified, means for justifying the line in the holder by lineal compression and the line-planer by which the type are pressed down upon their feet into alinement within the holder; with means for moving said holder laterally to transfer the line from the receiving to the discharging point, and means for moving said line-planer out of the way before the holder has moved.

64. The combination of means for composing type in line, a line-holder into which the composed type are moved and means for justifying the line of type in the holder by lineal compression, and the line-planer by which the type are pressed down upon their feet into alinement within the holder and held during justification thereof; with means for moving said holder to transfer the line from the receiving to the discharging point, and means for moving said line-planer out of the way before the holder has moved, and for returning it to position prior to the entrance of a line.

65. The combination of the means for composing a line of type, a laterally-movable line-holder containing a channel into which the composed lines of type are moved and justified by lineal compression, and means for moving the type-lines into said holder and compressing the same lineally therein; with a movable planer adapted to press all of the type in the line down upon their feet as they enter the holder and to retain the same upon their feet during the justification thereof, and means for moving said holder out of the way.

66. The combination of the means for composing type in line, a line-holder into which the type are moved and justified by compression and the line-planer by which the type are pressed down upon their feet into perfect alinement within the holder; with a rocking lever carrying said planer, the link connecting said rocking lever with a spring-controlled lever and cam for operating said spring-controlled lever so as to depress the planer at the proper time.

67. The combination of a packing-cylinder the movable line-holder, means for ejecting lines of type from the packing-cylinder into said holder, and means for removing the lines from the holder; with a movable line-planer adapted to force all the type in the line down upon their feet as they enter a holder, means for moving the holder alternately into position to receive a line from the packer-cylinder and into position to deliver the justified line to a transferring device, and means whereby said plunger is moved out of the way before the line-holder is shifted, substantially as described.

68. The combination of a packing-cylinder the movable line-holder, means for ejecting lines of type from the packing-cylinder into said holder and compressing the same lineally therein, and means for removing the justified lines from the holder; with a movable line-planer consisting of a straight line-bar provided with a series of rollers on its under side and mounted upon a rock-shaft and adapted to be depressed into position to force all the type in the line down upon their feet as they enter a holder, a cam-shaft, lever, and connections for moving the holder alternately into position to receive a line from the packer-cylinder and into position to deliver the justified line to the transferring device, and the connections whereby the planer is also operated from said shaft, said planer being moved out of the way before the line-holder is shifted, substantially as and for the purpose described.

69. The combination of the composing-channel, a space-holding channel communicating therewith, and means for ejecting the spaces from said space-holding channel; with an adjustable space-holding galley supported above said space-channel and communicating therewith, and means for locking said galley or reservoir when adjusted to bring any one of the channels therein to register with the space-holding channel until said channel is emptied, for the purpose and substantially as described.

70. In a type-setting machine the combination with a composing mechanism, of a space-feeding channel communicating therewith, a casting having a space-holding channel communicating with said space-feeding channel, means for ejecting spaces from said space-holding channel, a removable space galley or reservoir and an adjustable support for said galley attached to said casting, and adjustable transversely thereof so as to bring any one of the lines of spaces in said galley directly over the space-holding channel in said casting and means for locking said support when properly adjusted, substantially as described.

71. The combination of a casting provided with a space-holding channel, means for ejecting spaces singly from said channel and for conducting the same to the composing-point; with a sliding plate attached to said casting, a vertically-disposed space-galley-supporting bar attached to said plate and adjustable therewith, and a space reservoir or galley removably connected to said bar and adapted to be adjusted thereby so as to bring any one of the lines of spaces therein into register with the space-holding channels to supply the latter for the purpose and substantially as described.

72. The combination of a casting having a space-holding channel, and mechanism for ejecting spaces from said channel; with a sliding bar adjustably mounted on said casting, the space-galley-supporting bar attached to said sliding bar and having a bracing-foot and a removable longitudinally-channeled lead galley or reservoir, all substantially as and for the purpose described.

73. The combination of a casting having a space-holding channel, a guide-channel communicating with the latter channel and leading to the assembling-point, and mechanism for ejecting spaces from said channel; with a sliding bar 240 adjustably mounted in said casting, the space-galley-supporting bar attached to said sliding bar and having a foot 472$^c$ and the galley-supports 473 and 472$^a$, and a longitudinally-channeled lead galley or reservoir 471, all substantially as and for the purpose described.

74. The combination with the space channel or reservoir, a slide for ejecting the spaces therefrom, a cam and lever for actuating said slide, a continuously-driven friction-disk for driving said cam, and key-controlled locking mechanism whereby said cam is locked after each revolution thereof, for the purpose and substantially as described.

75. The combination of the space-holding channel, the ejector for discharging spaces therefrom, the ejector-operating cam and connections, and the continuously-driven friction-plate for operating said cam; with a latch-lever beside the cam adapted to lock the cam, a spring for throwing said latching-lever into position to engage the cam, and key-controlled mechanism for permitting said lever to release the cam.

76. The combination of a space-holding channel, the slide for ejecting the spaces therefrom, the levers and cam for operating said slide, and the continuously-driven friction-plate for operating said cam; with a double-armed latching-lever beside the cam having one arm adapted to engage and lock the cam, a spring for throwing said latching-lever into position to engage the cam, a dog for locking said lever in engagement with the cam, and key-controlled mechanism for causing said dog to release the lever, said latching-lever being immediately returned to locking position by the pin striking the upper arm thereof, for the purpose and substantially as described.

77. The combination of a space-holding channel, means for supplying spaces thereto, a slide for ejecting spaces laterally therefrom, a spring-pressed rocking lever for retracting said slide, and a cam for engaging said lever and causing it to operate the slide to eject a space; with a continuously-rotating friction-disk supporting and adapted to rotate said cam when permitted, an angular pivoted latch-lever beside the cam having one arm adapted to engage a pin thereon to lock the cam, said pin engaging the other arm of the latching-lever and returning it to locking position when it has once been released, and connections for releasing said cam from a key, substantially as described.

78. The combination of a space-holding channel, means for supplying spaces thereto, a slide for ejecting spaces laterally therefrom, a rocking lever for retracting said slide and a cam for engaging said lever and causing it to operate the slide to eject a space; with a continuously-rotating friction-disk supporting and adapted to rotate said cam when permitted, an angular pivoted latch-lever beside the cam having one arm adapted to engage a pin thereon to lock the cam, said pin engaging the other arm of the latching-lever and returning it to locking position when it has once been released, a spring connected to said lever adapted to throw it out of locking position, a rock-shaft, a dog on said rock-shaft adapted to engage said latch-lever and lock it in position to stop the cam, and connections for operating said shaft from the keyboard, all constructed and arranged substantially as described.

79. The combination with the composing mechanism of a type-setting machine, and a movable bar adapted to be pushed outward by the type during composition thereof, a sliding rack actuated by said movable bar, a pinion meshing with said rack, a large pinion connected to said smaller pinion and rotated therewith, and a line-indicating bar meshing with and operated by said larger pinion for the purpose and substantially as described.

80. The combination with the mechanism of a type-setting machine, and a movable bar adapted to be pushed outward by the type during composition thereof, a sliding rack actuated by said movable bar, a pinion meshing with said rack, a larger pinion connected to said smaller pinion and rotated therewith, and a line-indicating bar meshing with and operated by said larger pinion, said line-indicating bar having a dovetailed rib engaging a dovetail guide in the casing, and a coiled spring connected to the hub of the larger pinion and to the casing and adapted to return the parts to zero position, substantially as described.

81. The combination of a longitudinally-movable ratchet-bar contained in a casing, a spring for moving said bar in the direction in which its teeth point, and pivoted escapement-dogs engaging said ratchet-bar and adapted to permit a step-by-step movement thereof; with a key-controlled space-feeding mechanism, and connections between said mechanism and said escapement whereby the bar is permitted to move the distance of one tooth each time a space is ejected.

82. In an indicator the combination of a sliding ratchet-bar, a pair of pivoted dogs adapted to engage the ratchet, one of said dogs being thrown into and out of operative position by the other dog, a spring for throwing the latter dog into engagement with the ratchet, and means for intermittently disengaging the latter dog from the ratchet; with means for moving the ratchet in the direction of its teeth when permitted by the dogs, and means for returning the ratchet-bar to normal position.

83. The combination with the composing mechanism and a sliding bar adapted to indicate the extent of the line, of a sliding space-indicating bar beside the line-indicating bar having a ratchet-face, a pivoted dog engaging said ratchet and pressed inward by a spring, a second dog pivoted beside the first dog and pressed inward by a spring upon the first dog, but thrown outward by the pawl of the first dog when the latter engages the ratchet, means for moving said ratchet-bar in the direction of its teeth; a space-feeding mechanism and connections between said mechanism and said escapement whereby the space-indicating bar is moved one tooth each time a space is ejected, for the purpose and substantially as described.

84. The combination with the composing mechanism of a type-setting machine, and a movable bar adapted to be pushed outwardly by the incoming type, a sliding rack actuated by said movable bar, a pinion meshing with said rack, a larger pinion connected to said smaller pinion and rotated therewith, and a line-indicating bar meshing with and operated by said larger pinion; with a longitudinally-movable ratchet-bar contained in a casing, a spring for moving said bar in the direction in which its teeth point, pivoted escapement-dogs engaging said ratchet-bar and adapted to give a step-by-step movement thereto; a key-controlled space-feeding mechanism, and connections between said mechanism and said escapement whereby the ratchet-bar is permitted to move the distance of one tooth each time a space is ejected.

85. The combination of the composing mechanism, the sliding bar adapted to be moved by the incoming type during the composition of a line, the rack-bar connected to said movable bar, a small pinion operated by said rack-bar, a large pinion on the hub of the smaller pinion engaging a sliding rack-bar, whereby a line is indicated, and means for returning said parts to normal position; with the space-indicating bar comprising a ratchet-bar beside the line-indicating bar, a double-dog escapement mechanism for said line-indicating bar, the space-feeding mechanism and the connections between said mechanism and said escapement whereby the latter is caused to permit the space-indicating bar to move one notch each time a space is ejected, and means whereby both said indicating-bars are thrown back to normal position upon the completion of a line substantially as described.

86. The combination of the composing mechanism, the line-holder in which the lines are justified, and a line-transferrer for removing the lines from said holder to the galley; with a galley having a vertically-movable rule and longitudinally-movable plunger between which the line is moved by the transferrer, said plunger being grooved or channeled to permit the transferrer to return toward the line-holder before the plunger is retracted.

87. The combination of the galley-head, the plunger and rule adapted to form a line-receiving channel when the rule is raised and the plunger retracted, the lead-box supported above the rule and plunger having an opening in its bottom directly over a rule, and the movable lead-ejecting plate connected to and operated by said rule; with the follower in said lead-box, the rock-segments engaging the follower-head and rule-head, and the cams and connections substantially as described for rocking said segments.

88. The combination of the galley-head, the plunger and rule adapted to form a line-receiving channel when the rule is raised and the plunger retracted, the lead-box supported above the rule and plunger, having an opening in its bottom directly over the rule, the movable lead-ejecting plate connected to and operated by said rule and the stripper-plate to prevent leads being elevated in the box when the rule ascends; with the follower in said lead-box, the weighted cord for actuating said follower; the rock-segments engaging racks on the follower-head and rule-head, and the cams and connections substantially as described for rocking said segments.

89. The combination of the composing mechanism, the line-holder in which the lines are justified and a sliding line-transferrer for removing the lines from said holder to the galley; with a galley, a vertically-movable rule and a longitudinally-movable plunger in the galley between which the line is moved by the transferrer, said plunger being grooved or channeled to permit the transferrer to return toward the line-holder before the plunger is retracted; substantially as described.

90. The combination of the composing mechanism, the line-holder in which the lines are justified and a sliding line-transferrer for removing the lines from said holder to the galley; a galley, a vertically-movable rule and longitudinally-movable plunger therein between which the line is moved by the transferrer, said plunger being grooved or channeled to permit the transferrer to return toward the line-holder before the plunger is retracted; with a lead-box above the plunger having an opening directly over the rule, the lead-ejecting plate connected to the rule-operating head so as to eject the lead in front of the line of type as the rule descends, and means for actuating the rule and plunger, substantially as described.

91. The combination of the bracket, the galley movably supported thereon, the vertically-movable rule, connected to a sliding head provided with a rack, an oscillating segment engaging the rack and the cam and connections for oscillating said segment; with the plunger for pushing the type down in said galley, the oscillating segment engaging said plunger and the spring-pressed rack-bar for oscillating said segment in one direction, and a cam for forcing said bar in the opposite direction, all substantially as and for the purpose described.

92. The combination of the bracket, the galley movably supported thereon, the vertically-movable rule, connected to a sliding head provided with a rack, an oscillating segment engaging the rack and the cam and connections for oscillating said segment, a plunger for pushing the type down in said galley, the oscillating segment engaging said plunger and the spring-pressed rack-bar for oscillating said segment in one direction, and a cam for forcing said bar in the opposite direction with a removable lead-box above the plunger having an opening directly over the rule, the lead-ejecting plate connected to and operated from the rule-head, the plunger in the lead-box, and the means for operating said plunger, all substantially as and for the purpose set forth.

93. The combination of a type-composing channel, and a setter for forwarding the types in said channel; with a smoother pivoted above the channel and adapted to be struck and thrown up by the incoming type and drop by gravity upon the type below it thus smoothing the type down in said channel, substantially as described.

94. The combination of the type-receiving channel, means for forwarding types thereto; and a rotary setter for pushing the types into said channel; with a line-smoother 121 pivoted above and projecting partially over the channel and adapted to be struck by an incoming type and to drop by gravity upon the type below it thus smoothing the type down in the channel, for the purpose and substantially as described.

In testimony that I claim the foregoing as my own I affix my signature in presence of two witnesses.

PAUL FLEMMING COX.

In presence of—
MORRIS KLEIN,
HENRY L. VIBBERT.